United States Patent
Bielecki et al.

(10) Patent No.: US 9,441,177 B2
(45) Date of Patent: Sep. 13, 2016

(54) LUBRICATION WITH OIL-COMPATIBLE POLYMER BRUSHES

(75) Inventors: Robert M. Bielecki, Zurich (CH); Edmondo M. Benetti, Rubano (IT); Nicholas D. Spencer, Zollikon (CH)

(73) Assignee: The Swatch Group Research and Development Ltd., Marin (CH)

( * ) Notice: Subject to any disclaimer, the term of this patent is extended or adjusted under 35 U.S.C. 154(b) by 346 days.

(21) Appl. No.: 14/113,448

(22) PCT Filed: Apr. 3, 2012

(86) PCT No.: PCT/EP2012/056070
§ 371 (c)(1),
(2), (4) Date: Oct. 23, 2013

(87) PCT Pub. No.: WO2012/152512
PCT Pub. Date: Nov. 15, 2012

(65) Prior Publication Data
US 2014/0066343 A1    Mar. 6, 2014

(30) Foreign Application Priority Data

May 9, 2011  (EP) ..................................... 11165241
Oct. 18, 2011 (EP) ..................................... 11185621
Dec. 9, 2011  (EP) ..................................... 11192707

(51) Int. Cl.
*C10M 107/28* (2006.01)
*C09D 133/08* (2006.01)
*C10M 177/00* (2006.01)

(52) U.S. Cl.
CPC .......... *C10M 107/28* (2013.01); *C09D 133/08* (2013.01); *C10M 177/00* (2013.01);
(Continued)

(58) Field of Classification Search
CPC .................................................. C10M 107/28
USPC ........................................ 508/100, 103, 107
See application file for complete search history.

(56) References Cited

U.S. PATENT DOCUMENTS 6,692,914 B1 * 2/2004 Klaerner .................. C08F 4/00
                                                      435/6.11
7,205,161 B2 * 4/2007 Klaerner .......... G01N 33/54353
                                                      435/6.11
(Continued)

FOREIGN PATENT DOCUMENTS

JP    2008 267572    11/2008

OTHER PUBLICATIONS

Sakata, H. et al., "Tribological Properties of Poly(methyl methacrylate) Brushes Prepared by Surface-Initiated Atom transfer Radical Polymerization", Polymer Journal, vol. 37, No. 10, pp. 767-775, XP-002677244, (2005).
(Continued)

*Primary Examiner* — Ellen McAvoy
(74) *Attorney, Agent, or Firm* — Oblon, McClelland, Maier & Neustadt, L.L.P.

(57) ABSTRACT

A polymer-brush-based, surface-modification strategy for friction and wear reduction in hard contact under boundary-lubrication conditions is proposed, specifically for a non-aqueous environment. Surface-initiated Atom Transfer Radical Polymerization (SI-ATRP) was employed for the synthesis of three different oil-compatible, hydrophobic polymer brushes based on alkyl methacrylates. This study presents polymerization kinetics, chemical characterization by means of Fourier transform infrared spectroscopy (FTIR) and surface morphologies observed in atomic force microscopy (AFM). The lubrication properties of the anchored polymers were evaluated macroscopically by means of ball-on-disk methods and on the nanonewton scale by lateral force microscopy (AFM/LFM) and showed significant reduction in friction up to contact pressures as high as 460 MPa. The frictional response of surface-grafted polymers is shown to depend strongly on the compatibility of the polymer with the chosen lubricating fluid. Their good tribological performances have also been proven with watchmaking lubricants. These results do make the prevent invention a suitable candidate for a watchmaking application (such as at the balance pivot or the escapement) in order to increase the efficiency and reliability of the movements.

19 Claims, 20 Drawing Sheets

(52) U.S. Cl.
CPC ............ *C10M2203/0206* (2013.01); *C10M 2203/065* (2013.01); *C10M 2207/0406* (2013.01); *C10M 2207/2805* (2013.01); *C10M 2207/401* (2013.01); *C10M 2209/0845* (2013.01); *C10N 2250/121* (2013.01); *C10N 2270/00* (2013.01)

(56) References Cited

U.S. PATENT DOCUMENTS 7,994,234 B2 *   8/2011   Lukehart ............... B82Y 30/00
                                                    523/215

8,545,865 B2 *   10/2013  Boden ..................... A61L 27/34
                                                    424/422

OTHER PUBLICATIONS

Fan, J. et al., "Reduction of Friction by functionalised Viscosity Index Improvers", Tribology Letters, vol. 28, No. 3, pp. 287-298, XP019557536, (Oct. 2007).

Ozturk, E. et al., "Fabrication of ultrahydrophobic Poly(lauryl acrylate) brushes on silicon wafer via surface-initiated atom transfer radical polymerization", Applied Surface Science, vol. 257, No. 3, pp. 1015-1020, XP027284674,(Nov. 2010).

International Search Report Issued Jul. 9, 2012 in PCT/EP12/56070 Filed Apr. 3, 2012.

* cited by examiner

US 9,441,177 B2

LUBRICATION WITH OIL-COMPATIBLE POLYMER BRUSHES

CROSS REFERENCE TO RELATED APPLICATIONS

The present application is a 35 U.S.C. §371 national stage patent application of International patent application PCT/EP2012/056070, filed on Apr. 3, 2012, published as WO/2012/152512 on Nov. 15, 2012, the text of which is incorporated by reference, and claims the benefit of the filing date of European application nos. 11165241.8, filed on May 9, 2011; Ser. No. 11/185,621.7, filed on Oct. 18, 2011; and Ser. No. 11/192,707.5, filed on Dec. 9, 2011, the text of each of which is also incorporated by reference.

FIELD OF THE INVENTION

The invention relates to a low-friction assembly, and more specifically to an assembly of two parts that are either singly or both covered with suitable polymer brushes.

BACKGROUND OF THE INVENTION

A relative movement of mechanical parts, such as sliding or rolling, inevitably incurs friction and wear. Depending on the contact parameters, two main lubrication regimes, separated by the mixed regime, can be defined. On the one hand, during the hydrodynamic lubrication regime, i.e. at higher speeds or lower loads, the counter surfaces are fully separated by a lubricating film.

On the other hand, during the boundary regime, i.e. at lower speeds or higher loads, the lubricating film loses its integrity and contacts between asperities occur. Macroscopically, the boundary regime is characterised by a significant increase in friction coefficient values and generally by higher wear rates.

SUMMARY OF THE INVENTION

It is an object of the invention to overcome these drawbacks in proposing a novel polymer surface-modification strategy for friction and wear reductions in hard contacts, specifically for non-aqueous environments.

Hence, the invention relates to low friction device for reducing friction coefficient and wear of a first substrate against a second substrate characterised in that at least one of the substrates is covered with a coating including polymer brushes swollen by a trapped solvent.

Advantageously, a poly(alkyl-methacrylate) polymer brushes coating is grown from the surface (as opposed to "deposited on the surface"). Such a coating significantly reduces the coefficient of friction in the boundary regime, e.g. low speed or high load. Indeed, a stable and low friction coefficient is obtained (reduction of 5×) with a solvent-resistant polymeric covering that has compatibility with a simple and cheap lubricant, such as hexadecane.

According to other features of the invention:
polymer brushes are made of hydrophobic alkyl-methacrylate such as dodecyl-methacrylate (P12MA);
polymer brushes has a dry thickness of at least 250 nm in order to improve wear resistance;
polymer brushes are grafted onto said at least one of the substrates by use of pre-anchored initiator molecules;
the solvent is chosen in the group including ester type lubricants, alkane type lubricants, alkyl-aromatic lubricants, ether-alcohol lubricants, vegetal oil, animal oils, polyalcohol or ionic liquids;
the solvent viscosity is less than 200 cst in order to improve the friction coefficient;
substrates are made in a metallic and/or non-metallic materials such as silicon-based materials;
both substrates are covered;
at least one of the substrates is a toothed wheel and/or a pivot and/or bearing block and/or an escapement element.

A polymer-brush-based, surface-modification strategy for friction and wear reduction in hard contact under boundary-lubrication conditions is proposed, specifically for a non-aqueous environment. Surface-initiated Atom Transfer Radical Polymerisation (SI-ATRP) was employed for the synthesis of three different oil-compatible, hydrophobic polymer brushes based on alkyl methacrylates.

This application presents polymerisation kinetics, chemical characterization by means of Fourier transform infrared spectroscopy (FTIR) and surface morphologies observed in atomic force microscopy (AFM). The lubrication properties of the anchored polymers were evaluated macroscopically by means of ball-on-disk methods and on the nanonewton scale by lateral force microscopy (AFM/LFM) and showed significant reduction in friction up to contact pressures as high as 460 MPa. The frictional response of surface-grafted polymers is shown to depend strongly on the compatibility of the polymer with the chosen lubricating fluid.

Their good tribological performances have also been proven with watchmaking lubricants. These results do make the prevent invention a suitable candidate for a watchmaking application (such as at the balance pivot or the escapement) in order to increase the efficiency and reliability of the movements.

BRIEF DESCRIPTION OF THE DRAWINGS

Other features and advantages of the present invention will appear more clearly upon reading the following detailed description, made with reference to the annexed drawings, given by way of non-limiting and in with.

DETAILED DESCRIPTION OF THE PREFERRED EMBODIMENTS

Dimethylchlorosilane (Aldrich-Fine Chemicals, 98%), 10-undecen-1-ol (Aldrich-Fine Chemicals, 98%), 2-Bromo-2-methylpropionyl bromide (Acros Organics, 98%) and chloroplatinic acid hexahydrate (ABCR Deutschland 99.9%) were used for initiator synthesis as received.

Monomers, hexyl methacrylate (Aldrich-Fine Chemicals, 98%), dodecyl methacrylate (Acros Organics, 96%) and octadecyl methacrylate (TCI Deutschland GmbH, >95%) were diluted with pentane and purified from MEHQ inhibitor by passing through an alumina column.

4,4'-Dinonyl-2,2'-bipyridine (Aldrich-Fine Chemicals, 97%), anisole (Acros Organics, 99%) and copper (II) bromide (Sigma-Aldrich, 99%) were used as received. Copper bromide (Aldrich-Fine Chemicals, 5N) was purified by overnight washing in glacial acetic acid, washing with methanol and diethyl ether and drying under vacuum before use.

The synthesis of the initiator molecules followed the hereinafter protocol. From 10.7 ml of 10-undecen-1-ol in 50 ml dry THF (98% Sigma Aldrich), 9 ml (60 mmol) triethylamine (99.5% Sigma Aldrich) were added, followed by dropwise addition of a solution of 7 ml bromoisobutyrate in 20 ml dry THF. The mixture was stirred under argon for 24 hours and diluted with 100 ml of hexane (the hexane remains on top), washed twice with 100 ml of 2 M HCl (42 ml of 37% HCl added to 208 ml $H_2O$) and 4 times with 100 ml of ultra-pure water.

The organic phase was dried over magnesium sulfate for 60 minutes, and filtered through paper prior to concentration at 130 mbar at 40° C. The un-reacted hydroxyl-terminated olefins were removed by passing through a silica gel 60 column. The colorless oily product was concentrated under vacuum with rotation, and stored under Ar at 4° C. until needed. In the second reaction step, 2.54 g of the 10-undecen-1-yl 2-bromo-2-methylpropionate were added to approx. 10 mg of the platinum catalyst and 7.93 ml of dimethylchlorosilane. The compounds were stirred under Ar overnight in the dark and then filtered through a silica plug. The excess of unreacted silane was removed under vacuum. The synthesis of the end product was confirmed by $^1H$ NMR.

Figure 8:
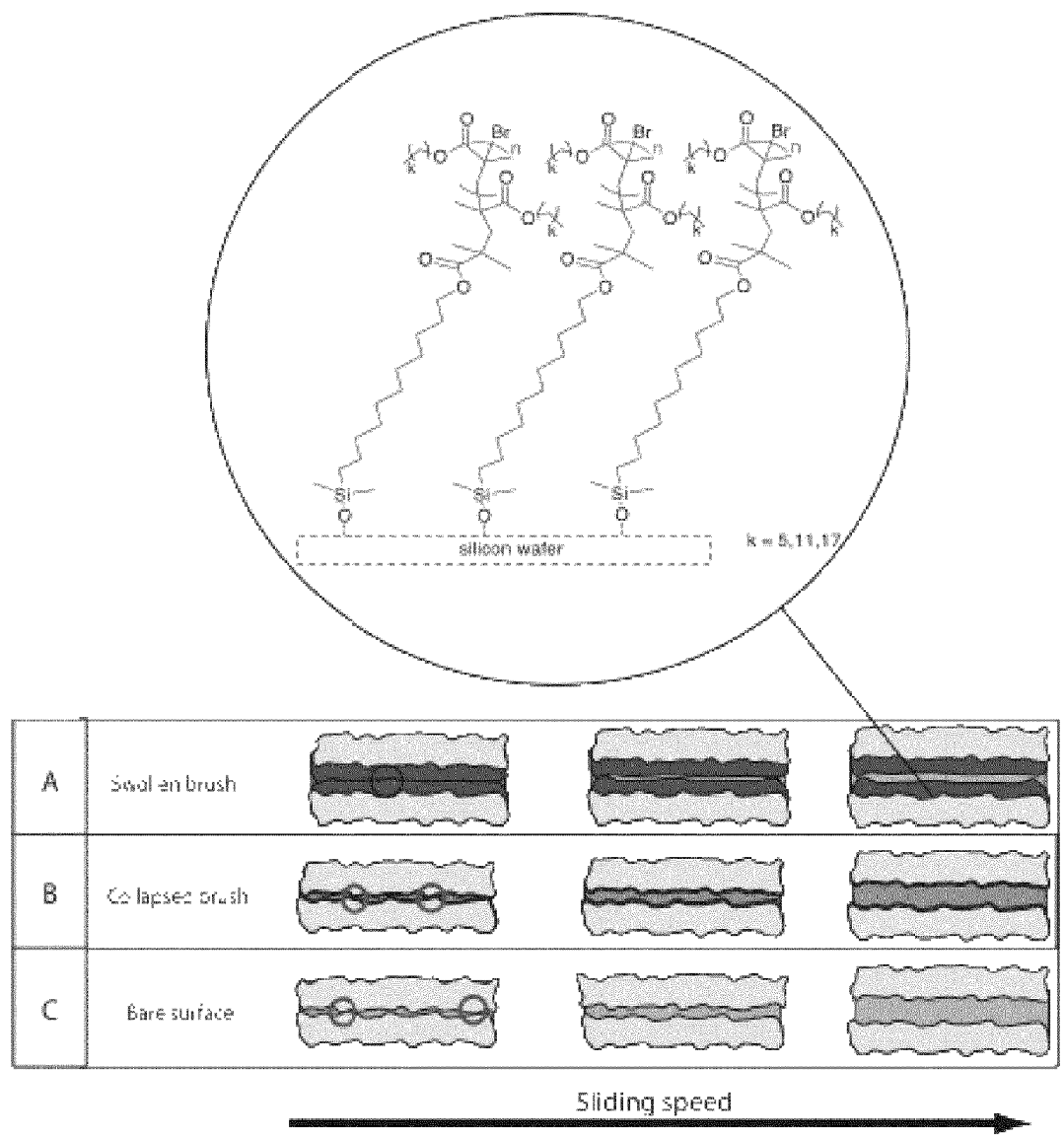
FIG. 8 is a schematic representation of polymer-brush-aided lubrication. At lower speeds, the polymer brush prevents asperity-asperity contact and confines the lubricant in the contact area. Snapshots of two sliding bodies with different surface functionalities observed at various speeds are depicted. A) Surface functionalized with a polymer brush surface in a good solvent B) Surface functionalized with a polymer brush present in a bad solvent. Collapsed brush—collapsed brush asperity contacts circled at the lower speed. C) Bare surfaces in a lubricating fluid. Asperity contacts circled at the lower speed.

Silicon wafers (P/B<100>, Si-Mat Silicon Wafers, Germany) were cut into 20×20 $mm^2$ pieces, washed 3 times with 2-isopropanol in a sonication bath, and treated for 30 minutes in the UV Ozone cleaner (UV/Ozone ProCleaner™ and ProCleaner™ Plus, BioForce, Iowa, USA). Cleaned wafers were immediately immersed in a 10 mM solution of the BPCS initiator in freshly distilled toluene and incubated under an Ar atmosphere for 3 hours. This was followed by washing 5 times in toluene and brief sonication in fresh toluene to remove the weakly bound molecules, before rinsing again with 2-isopropanol. Samples prepared in this way were dried in a stream of nitrogen and stored under a $N_2$ atmosphere until used. The choice of a monofunctional silane was dictated by the lower probability of multilayer formation, which may occur in the case of trichloro or trimethoxy silanes. FIG. 8 shows a representation of said monofunctional silane initiators.

Polymerisation reactions were carried out in an oxygen-free Schlenk line under argon. Monomers were mixed with anisole in the ratio of 9:1, dNbpy was added and the flask plugged with a rubber septum. After stirring and dissolution of the ligand, the solution underwent 4 freeze-pump-thaw cycles, to be later transferred to a second flask containing copper bromides. The solution containing copper, monomer and ligand was stirred for 5 minutes in a hot oil bath to achieve a dark-brown homogeneous mixture, which was later transferred with an oxygen-free syringe to tubes containing initiator-functionalised samples. For the polymerisation results presented below, the monomer:ligand:copper (I) bromide molar ratio was maintained constant for all polymers at 150:1.5:1. The reactions were carried out at 110° C. under Ar and quenched by opening to air and addition of toluene to dilute the reaction mixture.

Afterwards, samples were rinsed thoroughly with toluene and a 0.1 M solution of $Na_2EDTA$ was added to remove the remaining bromide moieties, followed by another toluene-washing step.

A variable-angle spectroscopic ellipsometer (VASE) (M-2000F, LOT Oriel GmbH, Darmstadt, Germany) was used to determine the reaction kinetics non-destructively, via the dry thickness of the surface-bound polymers. The ellipsometric measurement was collected at three different angles of incidence 65°, 70° and 75°, and the incident wavelength was varied between 995 and 370 nm. The obtained thickness values are a result of a fit to a three-layer model, Si jell/$SiO_2$/Cauchy, defined in the WVASE32 software (LOT Oriel GmbH, Darmstadt, Germany).

The brush films were studied with transmission FTIR spectrometry. The data was obtained in transmission mode on a Bruker IFS 66v IR, with a liquid-nitrogen-cooled MCT detector. The film thickness for all coatings analysed in FTIR was ca 120 nm. Collected spectra were baseline corrected and normalised with respect to the peak found at around 1730 cm$^{-1}$ characteristic for C=O vibration stretching and typical of esters.

All pull-off (adhesive) and lateral (friction) forces were measured on the nanoscale with an MFP-3D atomic force microscope (AFM) (Asylum Research, Santa Barbara, Calif.). The measurements were carried out in n-hexadecane (which best simulates an oil-like medium) and ethanol media. Colloidal probes were prepared by mounting SiO$_2$ (silica) colloidal spheres (Kromasil, Brewster, N.Y., diameter=15±0.5 μm) onto tipless silicon cantilevers (MICRO-MASH, San Jose, Calif.) by means of a uv-curable adhesive.

The normal stiffness (0.139, 0.17, 0.246, 0.342 N/m) of the cantilevers was found by means of the thermal-tuning technique, incorporated into the AFM software. Pull-off and lateral forces were measured through deflection of a laser beam on the position-sensitive photodiode (PSPD). Normal and lateral sensitivities were used to convert the PSPD generated signal (in volts) into Newtons for normal- and lateral-force measurements, respectively. The normal sensitivity of the colloidal probe was measured by determining the slope of the curve when a colloidal probe is pressed against a hard (SiO$_2$) surface. Lateral sensitivity was determined by pressing the colloidal probe laterally against a large hard sphere and measuring the deflection of the cantilever. The frictional response reported here for each load is the average of 20-30 line scans of 5 μm at at least 3 different locations. The friction force for each scan is calculated by averaging the forward and reverse friction forces as (friction force forward-friction force reverse)/2.

The swelling ratios of the polymer brushes were obtained from step-height measurements of intentionally scratched coatings. Step measurement was performed under very low forces (2 nN) using highly sensitive 40 μm long low-stiffness cantilevers in tapping mode (BL-AC40TS-C2, OLYMPUS, Japan, k=0.09 N/m, f=110 kHz in air, tip radius 10 nm). Samples were measured in ambient conditions (dry state), immersed in ethanol and immersed in hexadecane. Values of at least 10 different step-profiles were averaged. The swelling ratio was calculated as the step height under a given liquid divided by a value measured in dry state.

AFM imaging of polymer brush morphologies in dry state was done in tapping mode using silicon cantilevers which had normal spring constant k=46.9 N/m and resonance frequency f=314.5 kHz (AC160TS, Olympus, Japan).

Macroscopic pin-on-disk experiments were performed on a Newton scale, by means of a CETR Tribometer (UMT-2, Center for Tribology, Campbell Calif., USA). Measurements were made at room temperature.

The applied load was monitored at all times with a load cell and maintained at 3 N. The cup-shaped sample holder was specially designed with a 20×20 mm$^2$ machined undercut, to allow for a secure fixation of the silicon wafer. Highly polished Si balls, 6 mm in diameter (J. Hauser GmbH, Solms, Germany, $R_a$ below 20 nm) were mounted in a stainless-steel holder. The contact pair was completely immersed in the lubricant by filling the cup with hexadecane. 11 speed values were selected between 0.002 and 1.5 cm s$^{-1}$. At each speed, coefficient-of-friction values were averaged over 20 revolutions.

The BCSP-initiator-functionalised surfaces were characterised by static contact angle (CA) measurements. Silane layers adsorbed on a UV/ozone-cleaned ultra-hydrophilic surface (initial contact angle below 3°) resulted in contact angles of 77°±2°. The degree of hydrophilicity is a useful assay for the estimation of SAM composition in the case of mixed monolayers, or to identify less densely packed structures, in the case of single-component SAMs on silicon. The ellipsometric thickness of such self-assembled monolayers (SAM) was measured as 1.8±0.1 nm, which would correspond well to the estimated thickness of a compact and tilted (28°) SAM structure.

Figure 1:
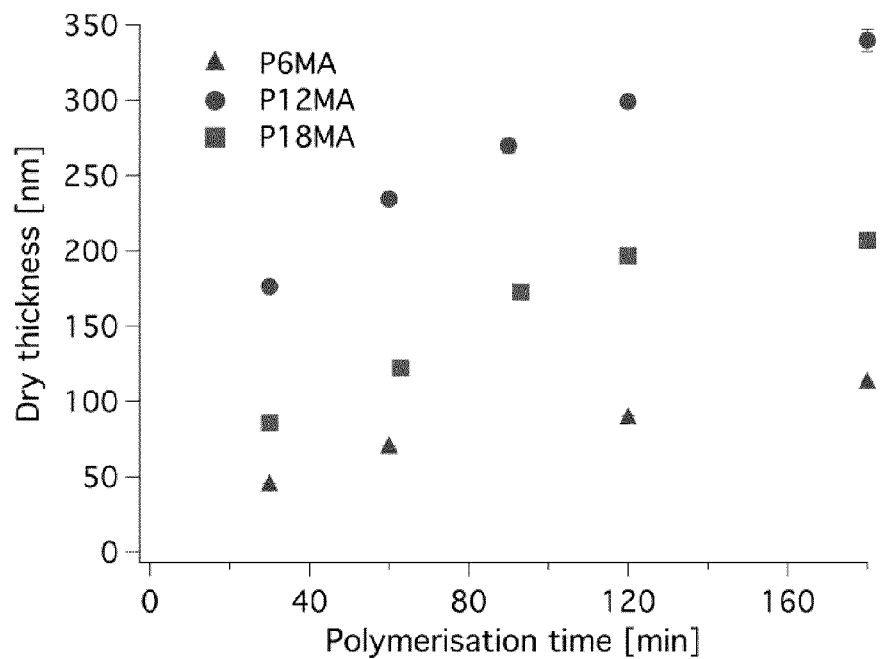
FIG. 1 is a graph showing the thickness of brushes of three kinds of polymers in relation to their polymerisation time.
Figure 31:
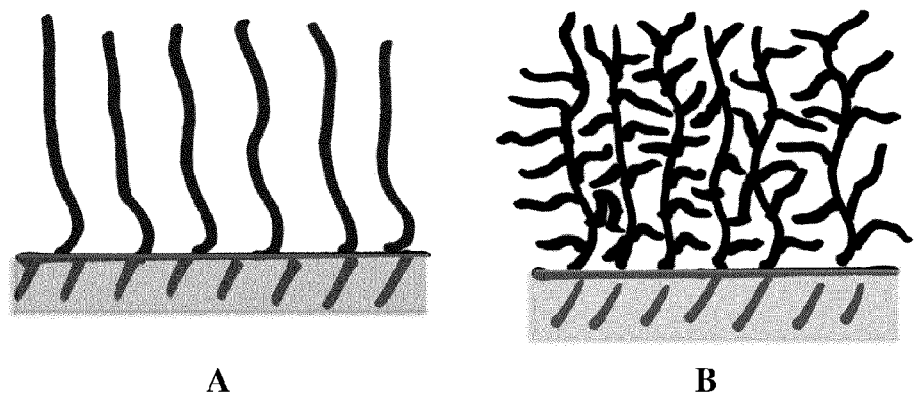
FIG. 31 is a representation of a linear polymer brushes (A) and branched polymer brushes (B)

The polymerisation kinetics are presented as averaged dry film-thickness values, measured at 5 different spots at each sample. The variation of dry film thickness for three different polymers as a function of the polymerization time is shown in FIG. 1. It was possible to achieve coatings thicker than 100 nm for all three alkyl methacrylates; nonetheless, dodecyl methacrylate (P12MA) was polymerised more readily than the other two monomers, reaching a maximum thickness of nearly 350 nm after three hours of polymerisation. FIG. 8 shows the link between each initiator and first polymerised monomer. FIG. 31 shows a schematic representation of a linear polymer brushes (A) and branched polymer brushes (B). Hence, representation A could be obtained based on mono-carbon chains whilst representation B shows linked multi-carbon monomers according to the invention.

Figure 3:
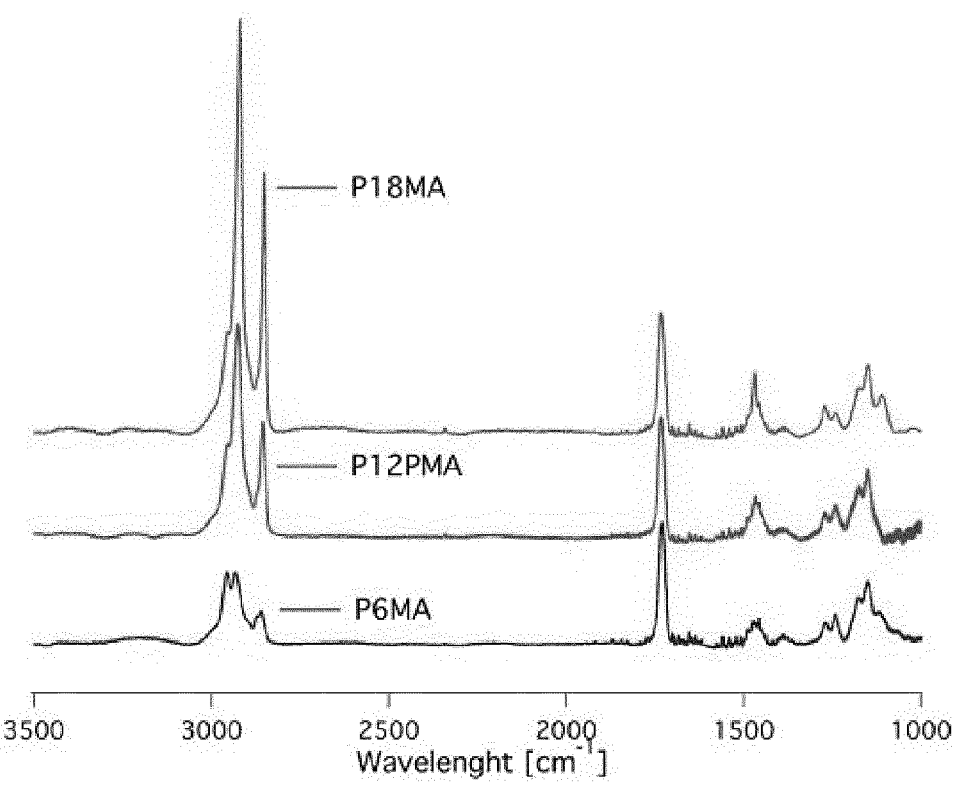
FIG. 3 is a spectrum obtained by Fourier Transform Infrared spectroscopy of three different synthesized polymers according to the invention.

FIG. 3 shows the transmission FTIR spectra for P18MA, P12MA and P6MA films of similar thickness, in a dry state. The characteristic absorption bands between 2950 cm$^{-1}$ and 2840 cm$^{-1}$ are assigned to CH$_3$ and CH$_2$. The intensity of the CH$_3$ peaks (at ca 2955 cm$^{-1}$ and ca 2872 cm$^{-1}$) is approximately equal for the three polymer brushes, whilst for the CH$_2$ peaks (at ca 2925 cm$^{-1}$ and 2850 cm$^{-1}$), an increasing peak area is observed as the length of the side-chains on the methacrylates increases.

The CH$_2$ stretching vibration bands are shifted from 2859, via 2854 to 2850 cm$^{-1}$, and from 2919, via 2925 to 2931 cm$^{-1}$ for the hexyl-, dodecyl- and octadecyl-based polymer series, respectively, which may be attributed to their different degrees of molecular aggregation. For all three polymers, C=O stretching vibration peaks were found at 1733 cm$^{-1}$. Further, peaks at around 1470 cm$^{-1}$ were assigned to C—H deformations, with increasing intensity with increasing side-chain length.

Figure 2:
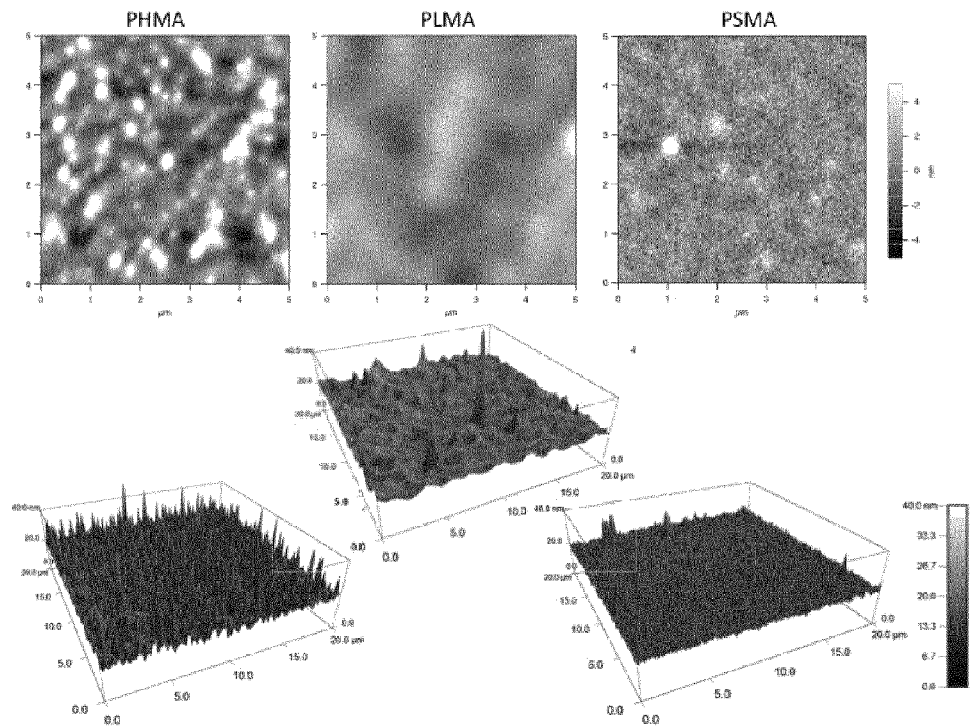
FIG. 2 shows the surface topographies of three different manufactured polymers according to the invention.

The surface morphology of the toluene-treated and dried polymer-coated samples was studied at room temperature (24° C.) in ambient air. Images recorded with AFM reveal differences between the physical states of different samples (FIG. 2). The surface of poly(hexyl methacrylate) with RMS 2.90 nm was identified to be the roughest of the three analysed samples, with features in the 200-500 nm range. The P12MA has a smoothly changing morphology and, like P18MA, is characterized by RMS values of around 1.3 nm (see table 1). It should be borne in mind that surface roughness and surface morphology of dried polymer brushes will play a minimal role in determining the coefficient of friction for polymer brushes immersed in a good solvent.

TABLE 1

RMS roughness values as measured on the surfaces of poly(alkyl methacrylate) brushes in air.

| Sample | RMS from 20 × 20 μm$^2$ image [nm] | RMS from 5 × 5 μm$^2$ image [nm] |
| --- | --- | --- |
| P6MA | 2.90 | 2.92 |
| P12MA | 1.26 | 0.92 |
| P18MA | 1.36 | 1.35 |

The height change of the polymer brush upon immersion in a solvent was measured by low-force tapping-mode imaging of steps obtained by local coating removal. All three polymer brushes, when immersed in ethanol, have a negligible thickness change, they are not soluble and they do not swell. The two longer side chain polymer brushes when immersed in hexadecane increase their height and present up to 9 fold increases in the step heights for the P12MA. The P6MA polymer brush does not swell in hexadecane either.

To study the lubricating properties of the proposed polymers, the frictional forces were studied under various normal loads on the nN and N scales. Stribeck curves for the most promising polymer, P12MA, were generated on the N scale, to identify the different lubrication regimes. The following three cases were studied: (i) unmodified silicon ball and wafer (control, both scales), (ii) bare ball and surface grafted with polymers (FIG. 4 and FIG. 5) (nN scale) and (iii) both surfaces grafted with polymers (FIG. 7) (N scale).

Nano-scale tribological measurements were carried out by means of an atomic force microscope. Friction force was recorded at an applied normal load between 10 nN and 200 nN. A least-mean-square error linear fit has been performed between the points, in order to obtain reliable coefficient of friction values (defined here as the slope of the straight-line friction-load plots).

Figure 4:
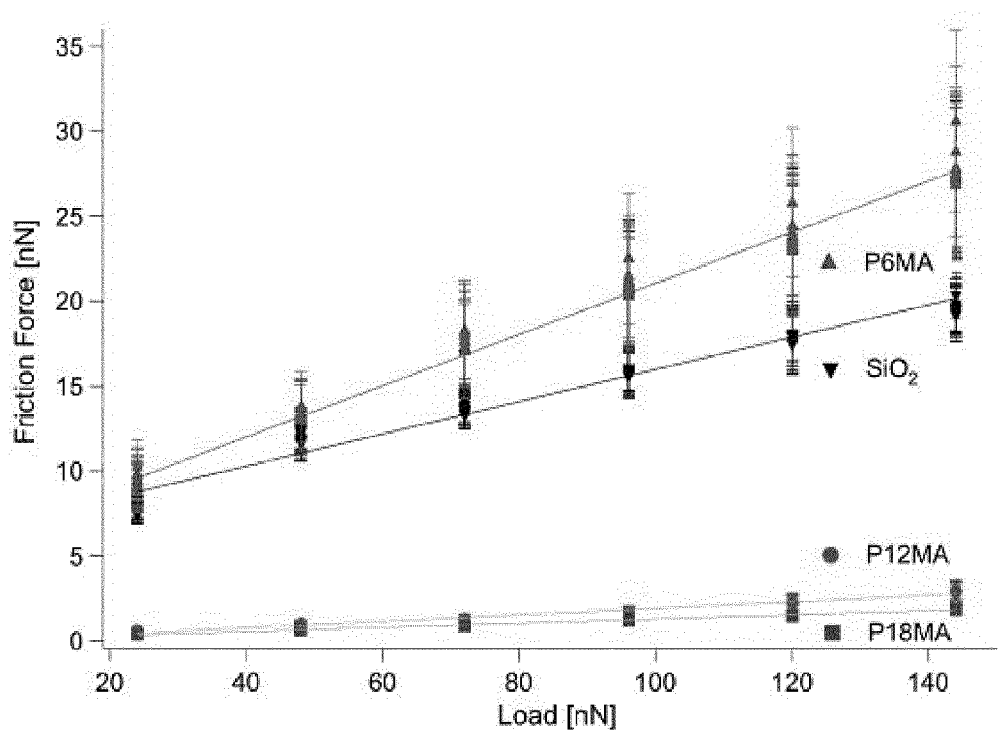
FIG. 4 is a graph showing the friction force in relation to the load, obtained with an Atomic Force Microscope of four lubricated substrates (3 with polymers, 1 bare surface)

FIG. 4 displays the recorded friction forces as a function of applied normal load, when the bare silica colloid (16 μm in diameter) was slid against an unmodified silicon wafer or polymer-coated wafers, measured in hexadecane. Surfaces coated with P12MA and P18MA display significantly lower coefficients of friction compared to those measured on an unmodified silicon wafer. However, no friction-reducing effect was observed for the poly (hexyl methacrylate)-based brush.

For all four substrate types, the friction force increased linearly with increasing load, implying a uniform coefficient of friction over the studied load range. Furthermore, cycles of increasing and decreasing loads for P12MA and P18MA did not reveal any coefficient of friction hysteresis, demonstrating the stability of the coatings under these experimental conditions.

Figure 5:
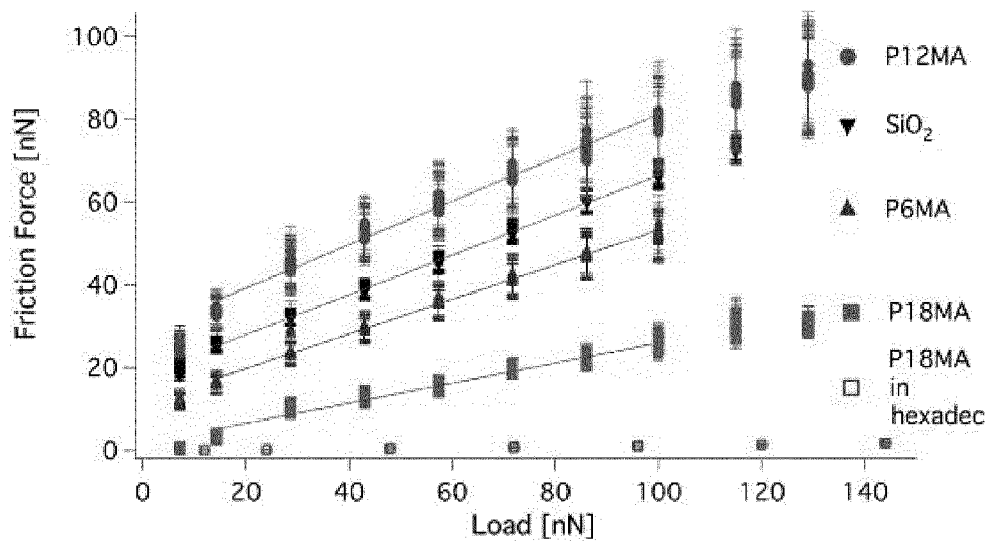
FIG. 5 is a graph showing the friction force in relation to the load obtained with an Atomic Force Microscope of four non-lubricated substrates and one lubricated substrate.

The frictional response of the grafted polymers depends on the interaction of the polymers with the surrounding medium. In order to verify the role of the solvent during the friction tests, the same surfaces were studied under ethanol—a liquid in which free poly (alkyl methacrylates) were found to be insoluble. The results presented in FIG. 5 show the frictional characteristics for all the three polymers when ethanol was used as a liquid medium.

For all four samples, the slopes of their friction-load curves appear similar. This suggests that under ethanol, similar coefficients of friction were present on all substrates, with some vertical offset on the friction-force axis, relating to differences in adhesive properties. The coefficient of friction for the polymer-coated wafers is lowest for the P18MA brush with a value of 0.25, the P6MA and P12MA having COFs of ca 0.46. This could be a result of the transition temperatures Tg (and Tm reported for P18MA) of the studied polymers. The higher Tg or high Tm would provide a harder surface at which elastic energy dissipation would be smaller together with the lower measured coefficient of friction.

Table 2 presents the calculated coefficient-of-friction values for the LFM-analysed samples in both hexadecane and ethanol:

| Sample | COF in hexadecane | COF in ethanol |
| --- | --- | --- |
| $SiO_2$ | 0.095 ± 0.001 | 0.312 ± 0.148 |
| P6MA | 0.151 ± 0.002 | 0.463 ± 0.058 |
| P12MA | 0.019 ± 0.001 | 0.464 ± 0.083 |
| P18MA | 0.013 ± 0.001 | 0.253 ± 0.018 |

The frictional data were complemented with an analysis of the adhesive properties of the coatings under different solvent conditions. Adhesive properties were obtained from pull-off forces measured during force-distance curves, performed with a colloid-modified AFM cantilever. A systematic analysis of sets of force-displacement curves has been performed for all samples in ethanol and in hexadecane.

Figure 6:
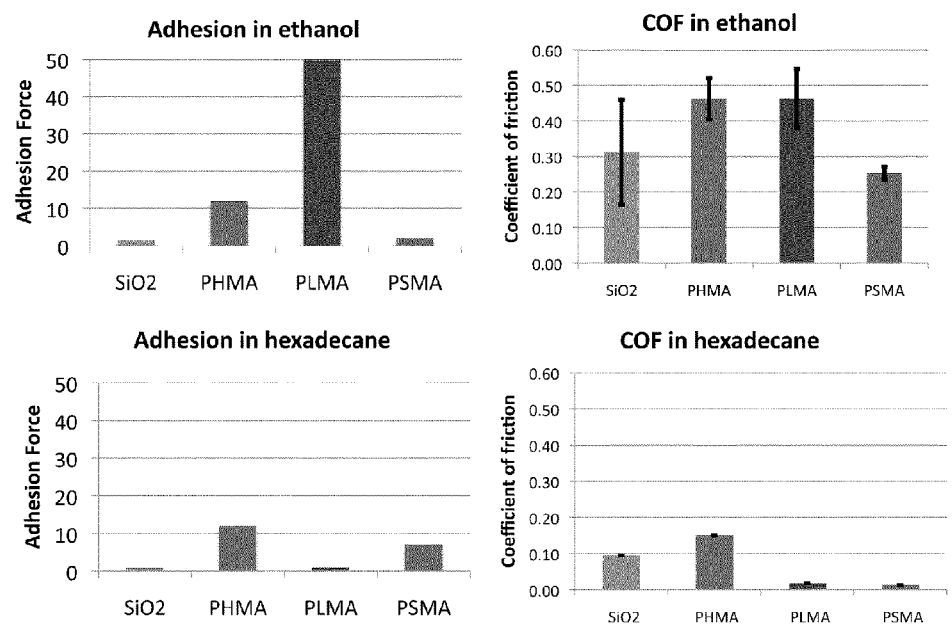
FIG. 6 is a graphic comparison between friction and adhesion in function of the solvent used (AFM measurements)
Figure 6B:
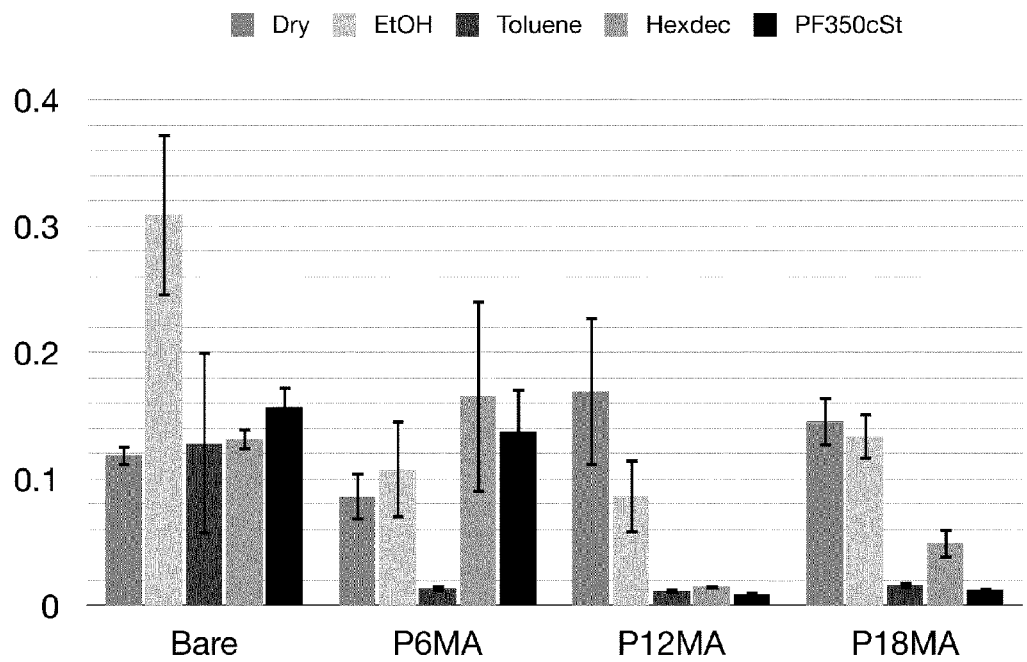
FIG. 6b is a graphic comparison of the friction coefficients obtained in various liquids for the 3 tested polymers and for bare surfaces.

The mean adhesion-force values are presented in FIGS. 6 & 6b, and are compared with the coefficient of friction values observed for the given sample (hexyl-(C6), i.e. P6MA, dodecyl-(C12), i.e. P12MA, and octadecyl-(C18), i.e. P18MA, methacrylate monomers respectively, PHMA, PLMA & PSMA have been employed).

Figure 7:
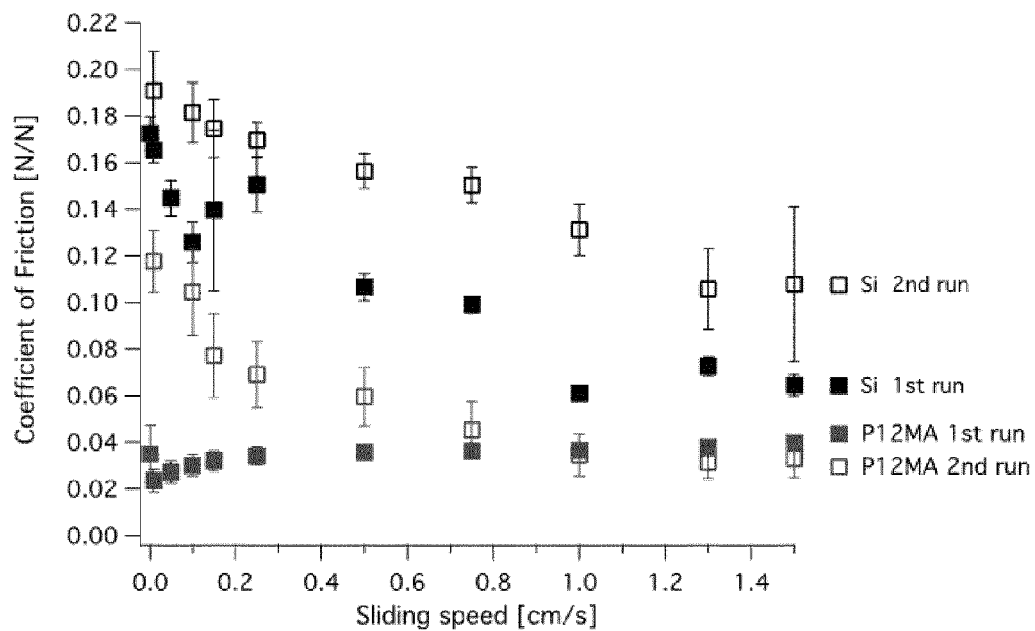
FIG. 7 shows Brush-brush macrotribological measurements, load 3 N ($p_{avg}$=310 MPa, $p_{max}$ 460 MPa), radius 1.8 mm, in hexadecane, Si wafer+PLMA 250 nm (dry thickness), Si ball+PLMA (ca 250 nm dry thickness) ca 20 rotations for each speed.

Newton-scale tribological tests were carried out (at 3N: 460 MPa maximum Hertzian contact pressure) for the case when both the surfaces were coated with polymers, and compared with a bare-bare silicon-contact control. In these experiments, each surface was grafted with a 250-nm-thick (dry thickness) poly (dodecyl methacrylate) brush. For the case of polymer-coated surfaces, it was possible to maintain a low coefficient of friction for all speeds ranging from 1.5 cm/s down to 0.002 cm/s during the first run (cumulative distance 2.5 meters). A repetition without changing the pin position, i.e. following the same wear track, led to coating failure near the end of the second run (cumulative distance 3.6 meters), observed as an increase in friction coefficient at the 0.75 cm/s testing speed (FIG. 7).

The preparation of poly (octadecyl-dodecyl- and hexyl-methacrylates) in solution has been reported, by free-radical polymerization, and, more recently, along with poly (dodecyl methacrylate) and poly (octadecyl methacrylate) copolymers by living atom transfer radical polymerization (ATRP). In the present study surface-initiated atom transfer radical polymerization reactions have been carried out as a means to grafting these methacrylate polymers onto surfaces in the form of brushes—previously only carried out for poly (dodecyl acrylate).

The polymerization kinetics are presented in terms of dry polymer thickness. A range of the corresponding molecular weight of the synthesized polymer brushes can be given based on equation (1), assuming that the grafting density for SI-ATRP corresponds to 0.1-0.7 chains/$nm^2$. Grafting densities of 0.5 chains/$nm^2$ are considered to be the upper limit, and difficult to reach for all but the least bulky monomers, such as methyl methacrylate (0.7 chains/$nm^2$).

On the other hand, grafting densities below 0.05-0.1 chains/$nm^2$ are considered to be in the low-density regime achievable by grafting-to strategies. A second indirect method to estimate polymer-brush density assumes that on average 1 out of 10 initiator molecules present in a well-packed SAM structure is actually employed during the surface-initiated polymerization.

Based on equation (1), the surface density σ of the initiator monolayer (thickness d=1.8 nm, ρ=1.1 g/$cm^3$ and Mw=413.89 g/mol) was calculated to be ca 2.88 initiator/$nm^2$. Thus, if 10% of the initiating molecules population would yield a polymer chain, the resulting polymer brush surface density of 0.28 chains/$nm^2$ would be present at the surface, which is well within the reported σ range.

Therefore, assuming a chain-grafting density of 0.3 chains/$nm^2$, the molecular weight for a polymer film of dry thickness 50, 150 and 300 nm would correspond to 110 000, 330 000 and 660 000 g/mol, respectively. The assumed grafting density value would be in accordance with the work of Öztürk et al, who have reported poly(dodecyl acrylate) brushes with grafting density 0.27-0.32 chains/$nm^2$ and Mw of 44 000 Da after 14 hours of SI-ATRP. Regardless of the rapid kinetics observed in our study, the preservation of the living radical character by the ability to reinitiate the brush growth at least twice could still be demonstrated.

$$Mw = \frac{d\rho N_A}{\sigma} \quad (1)$$

The above considerations are strictly theoretical and serve to set the readers' attention on the size scale of the studied polymers. In fact, the real surface grafting density may vary for the three poly(alkyl methacrylates) as a consequence of the different monomer size, which will affect the initiator efficiency due to steric hindrance of the active sites, especially in the case of the larger octadecyl methacrylate molecules. The lower thickness values achieved for the P6MA and P18MA polymers could be related to the lower ATRP catalytic activity of the copper-ligand complex, for which the 12-carbon substituted alkyl methacrylate would be preferred to the other two monomers: Many studies have been conducted on ATRP catalyst structure-reactivity relationships, with the important outcome that there exists a need to match a catalyst with a specific monomer in order to control and exploit the ATRP equilibrium.

Before dealing with the friction-reducing effect observed in hexadecane for the longer-side-chain poly(alkyl methacrylate)-functionalized surfaces (P12MA and P18MA), the lack of any friction-reducing effect for the polymers studied in ethanol will be discussed.

This can be explained in terms of a failure to satisfy the principal requirements needed to form a polymer-brush-based lubricious layer. Highly hydrophobic poly(alkyl methacrylate) brushes are insoluble in polar solvents such as ethanol. This was confirmed empirically for all three polymers and observed as a precipitation of the free polymer from toluene solutions upon addition of ethanol and a swelling ratio of polymer brushes in ethanol close to 1 for P6MA and P12MA brushes (swollen thicknes/dry thickness ≈1). As a consequence, the brush conformation "A" cannot be attained, and thus sliding only occurs on a collapsed polymeric material "B". FIG. 8 depicts this as being analogous to a bare surface contact "C" when lowering the sliding speed or increasing the load, at which point film failure and asperity contact occurs.

A similar explanation can be applied to the high coefficient of friction observed for the P6MA polymer studied in hexadecane, which is not very soluble in the long-chain hydrocarbon oil. The adhesive response of poly (hexyl methacrylate) brushes does not vary strongly with a change of the solvent between ethanol and hexadecane, and similarly, the frictional response is similar to that of a bare silicon wafer. This suggests that the P6MA brush does not react to a solvent change and knowing its incompatibility with ethanol it may be assumed that it is not in a stretched-out brush configuration in hexadecane either. Thus, achievement of low coefficient of friction for P6MA in hexadecane was not observed.

For poly(alkyl methacrylate)s in ethanol, assuming that no extended brush structure is formed and that the chains are poorly solvated, operation under conditions analogous to dry sliding occur. Under these conditions, polymer properties such as glass-transition temperature, roughness, etc. are of importance in determining the friction. Studies of poly(alkyl methacrylates) have shown that increasing the side-chain length of the alkyl methacrylates generally lowers the Tg. The glass-transition temperatures, as measured for bulk polymers, can be approximated for the 6, 12 and 18 carbon substituted methacrylates as being −5° C., −34° C. and −100° C., respectively.

However, further extension of the side chain to more than 12 carbons correlates with increased flexibility, and allows for formation of crystalline domains in the structure, and for the P18MA a melting temperature Tm of 27° C. has been reported. It was observed that, in a collapsed state of P18MA, the coefficient of friction was lower than for the other polymers, most likely due to the stiff crystalline domains and a smaller plowing effect. It should also be borne in mind that the glass temperatures of surface-tethered polymers that have constrained freedom may in fact be higher than those reported for free polymers. An X-ray photon correlation spectroscopy study of end-grafted and free polystyrene films showed a significant reduction in surface-height fluctuation for the grafted system.

Based on the above, for the polymers brushes in their collapsed state (e.g. immersed in ethanol), the difference between the glass-transition temperature for a specific polymer and the temperature at which the friction measurements were carried out will influence the contact properties, which are determined by the mobility of the polymeric chains at the temperature of the measurements.

This assumption was confirmed by the pull-off measurements carried out in ethanol (compare FIG. 6), where the P12MA coating displayed the highest adhesion force (58° C. above bulk Tg), exceeding that of P6MA (29° C. above bulk Tg) and P18MA (3° C. above bulk Tm), with the latter displaying negligibly small values, most probably due to the low chain flexibility of the poly(octadecyl methacrylate) at room temperature. The powdery appearance of the dried, free P18MA polymer would correlate with its non-adhesive character observed in AFM. No clear correlation between pull-off forces and coefficient of friction was found for the polymers immersed in ethanol.

Tribological studies on the nN scale of P12MA and P18MA polymer brushes immersed in hexadecane revealed a significant reduction of the coefficient of friction by a factor of >5. P12MA in hexadecane also exhibited repulsive behaviour during a force-distance curve acquisition with a silica probe, and a 20-fold decrease in the pull-off forces, consistent with a dense, extended polymer-brush conformation. The lubricious properties of P12MA and P18MA are attributed to their solvation by hexadecane. This was also consistent with the dissolution of the corresponding free polymer samples in the same solvent. For the P12MA polymer brush hexadecane system the swelling ratio was found to be around 9. Low values of the coefficient of friction were observed on the nN scale for single-side polymer-modified contact.

For tribological studies on the Newton scale for a P12MA double-side-coated contact, under 460 MPa maximal Hertzian contact pressure, very low coefficient-of-friction values (below 0.04) were found for all speeds and were nearly invariable with sliding speed (COF=0.024 at 0.01 cm·s$^{-1}$).

The unmodified (Si—Si) control contact pair was characterised by a 200% higher COF, even at the highest testing speed. The coefficient of friction gradually increased upon lowering the sliding speed, reaching 0.19 for 0.01 cm·s$^{-1}$.

Figure 10B:
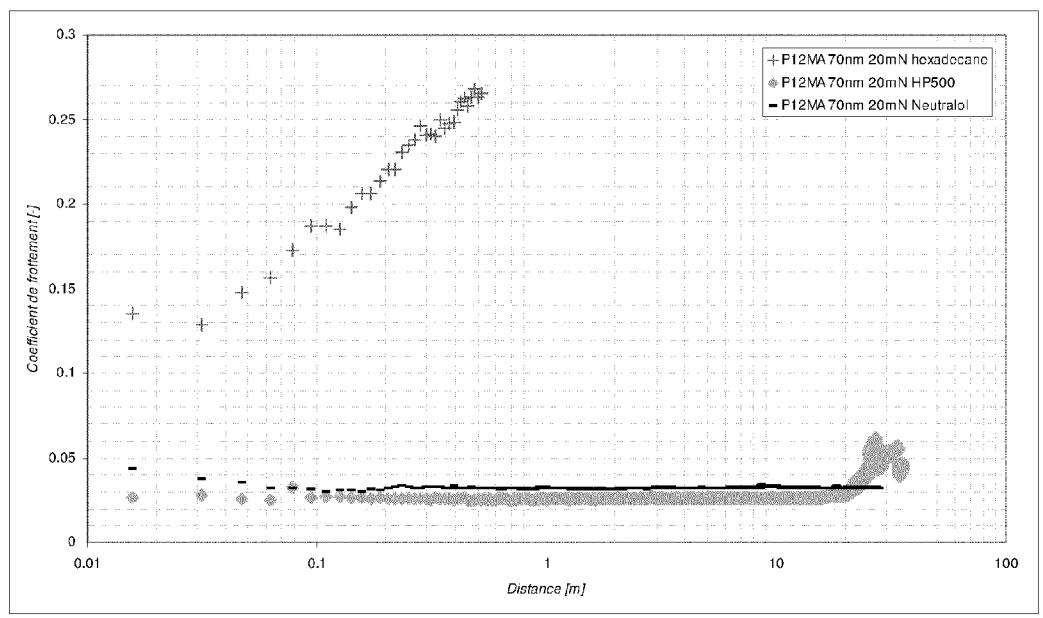
FIGS. 10b, 10c, 10d can be considered as an endurance test comparison for different P12MA thickness in various lubricants. It shows the coefficient of friction according to the sliding distance.
Figure 9:
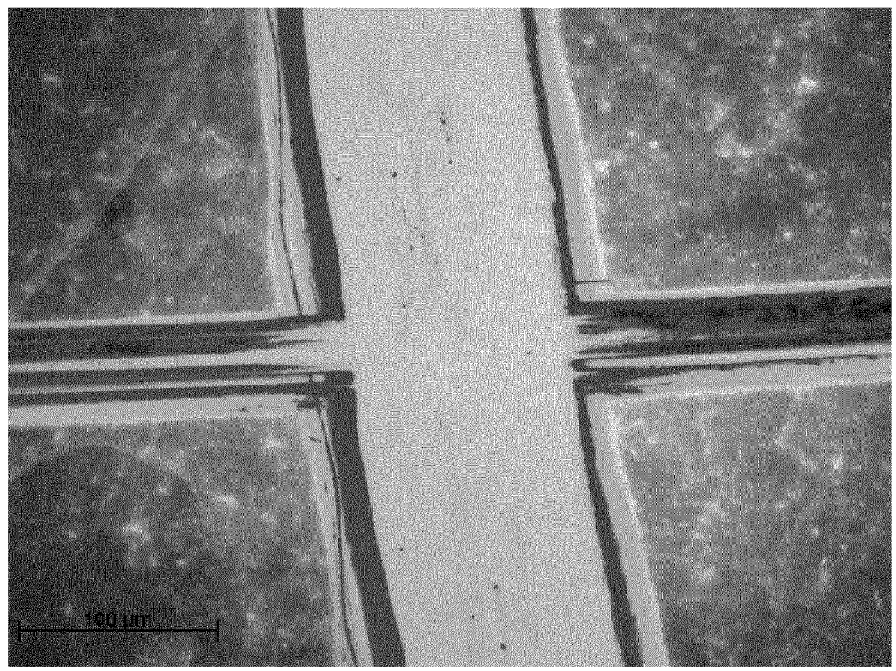
FIG. 9 is an optical microscopy image of the P12MA functionalised silicon wafer (250 nm dry thickness) after Newton-scale tribological experiments. The broad vertical band is a wear track after cumulative sliding track of 3.6 meters. The horizontal line is a scratch made with tweezers to display the underlaying wafer surface. The interference color changes at the edges of the worn areas correspond to the polymer thickness.
Figure 10:
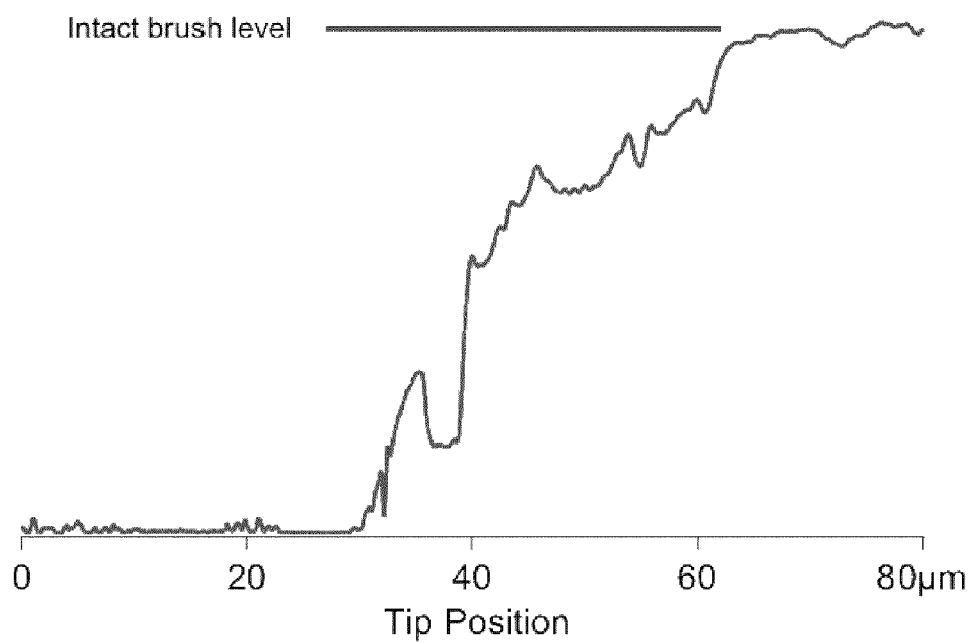
FIG. 10 is an AFM section of the wear track of the P12MA functionalised silicon wafer (250 nm dry thickness) after Newton-scale tribological experiments. Imaging in contact mode in a dry state.

Prolonged sliding of the P12MA-coated sliding pair in hexadecane on the same track led ultimately to an increase in the coefficient of friction associated with wear. The wear processes are most likely to initiate on the ball, which travels the entire sliding distance with the same point-of-contact, while locations on the surface are only stressed once per revolution. Following the tribological studies over a sliding distance of 3.6 m, the complete removal of the polymeric film from the disk surface was confirmed by optical microscopy images (FIG. 9) and AFM imaging of the wear track (FIG. 10). Macroscopic tribological studies are often related to asperity-asperity and non-uniform contact, leading to more severe conditions than those predicted by the Hertzian theory. A more detailed exploration of the wear mechanism is the objective of ongoing studies.

Hydrophobic, oil-compatible polymer films have been prepared via a surface-initiated, controlled-radical-polymerization method. Such grafted-from structures are covalently attached to the substrate—thus contributing to their stability, both with respect to the solvent and towards tribological stress. Poly(dodecyl methacrylate) and poly(stearyl methacrylate) layers, were shown on the nN scale to provide a low coefficient of friction at the level of 0.02 in the presence of a hydrophobic solvent (hexadecane) for brush-hard surface tribological contact in the AFM.

However, immersion in a poor solvent for a given polymer brush essentially switched off their lubricous properties. Newton-scale studies of Poly(dodecyl methacrylate) brushes grafted onto both silicon counterfaces and lubricated with hexadecane withstood over 300 revolutions (3.6 meters) at a maximum Hertzian contact pressure of 460 MPa. These results indicate that long alkyl-bearing polymethacrylates brushes represent promising candidates for imparting low friction and protection to surfaces in oil-like systems. These polymeric films, for the first time applied in a brush-like configuration, would represent excellent coatings for metallic and non-metallic materials operating in contact with oils.

Various types of lubricants has been analysed in order to confirm our approach that use of lub-swelling polymers is compatible with classic lubricants notably from clock industry. Differences in term of chemical groupings, polarities and viscosities are introduced since the lubricant is able to solvate and/or swell the polymers.

Hence, in a first hand, polyolester lubricants which are esters with fatty chains (variable length, saturated or not), called High Pressure series (HP), and in the other hand of the Alkane type (resulting from oil more or less containing naphtha and aromatic with fatty chains) have been investigated. It has been found that others alkyl-aromatic and ether-alcohol synthetic would be suitable too.

Figure 11:
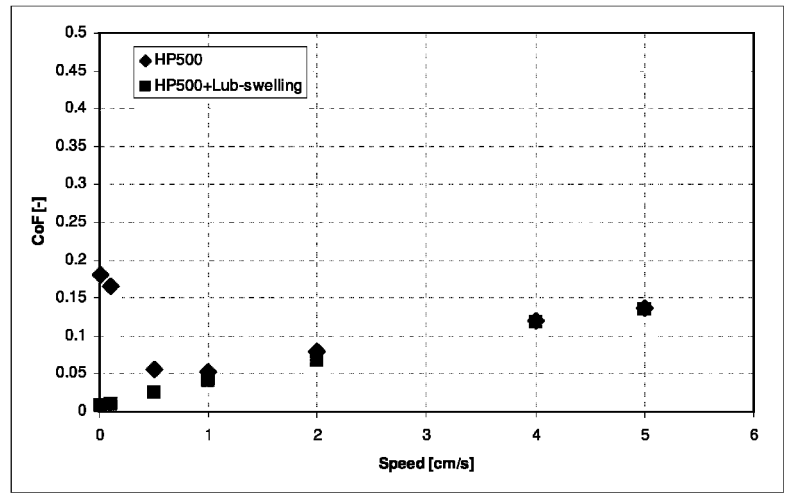
FIGS. 11-16 are graphs showing the positive influence of the lub-swelling configuration compared to the bare surface one regarding different ester type lubricants.
Figure 12:
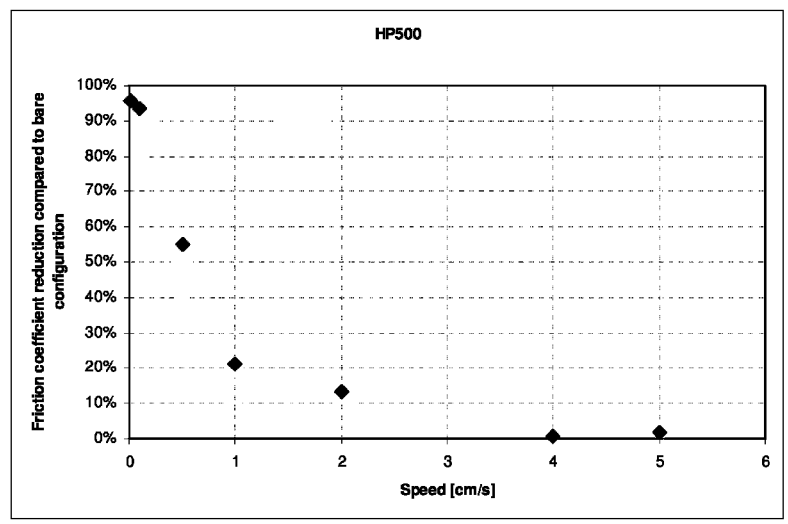
Figure 13:
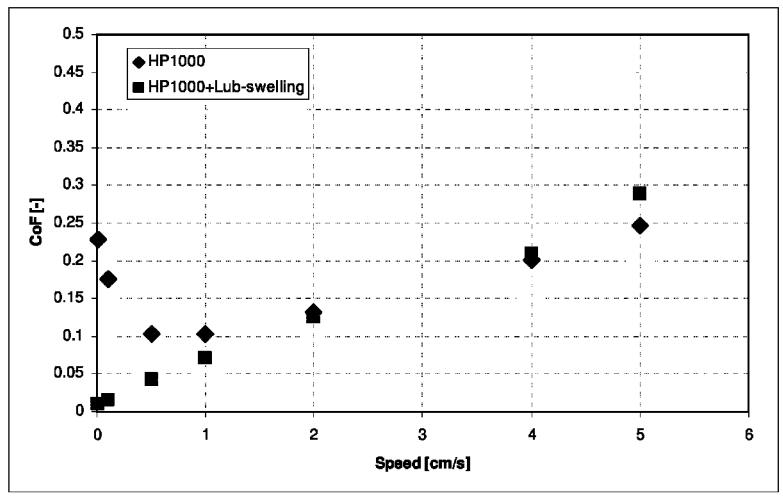
Figure 14:
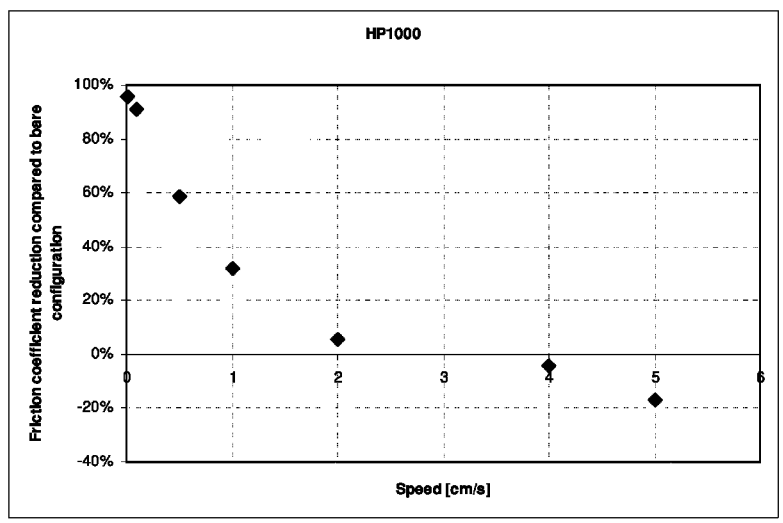
Figure 15:
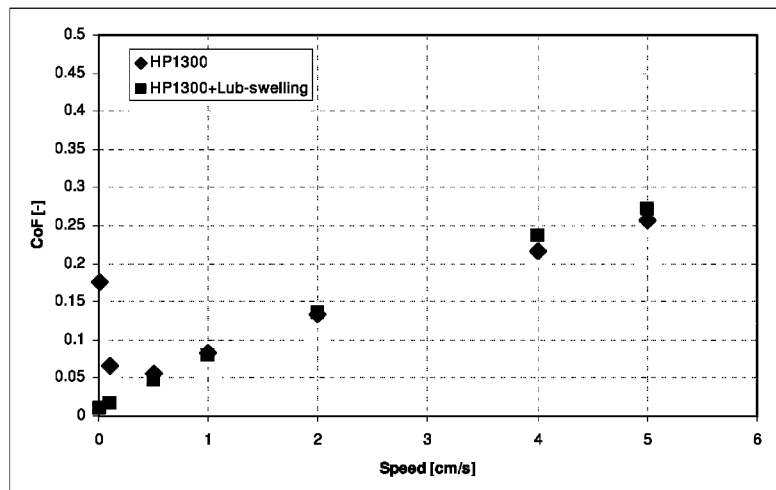
Figure 16:
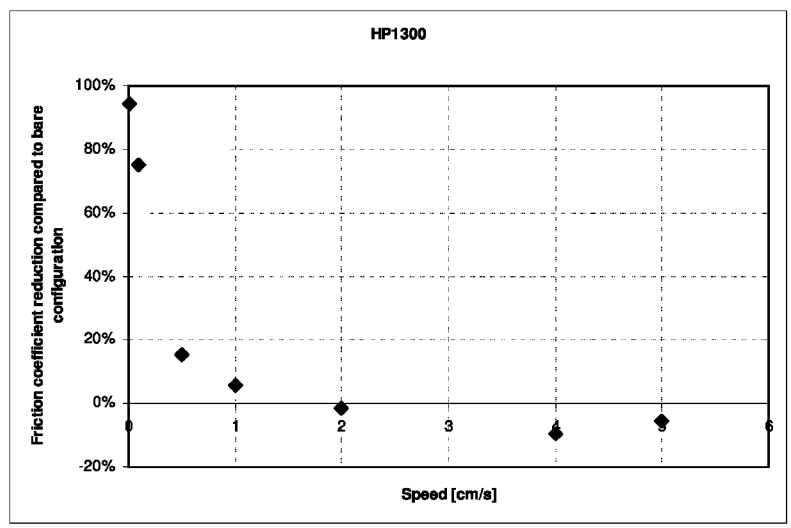
Figure 17:
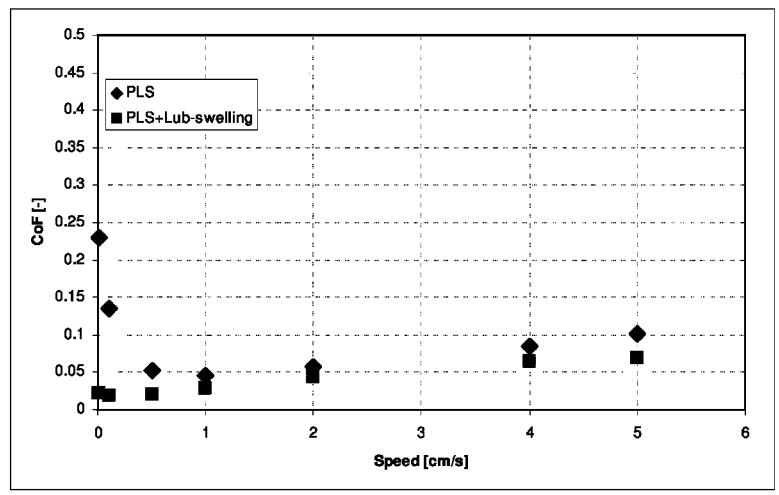
FIGS. 17-30 are graphs showing the positive influence of the lub-swelling configuration compared to the bare surface one regarding different alkane type lubricants.
Figure 18:
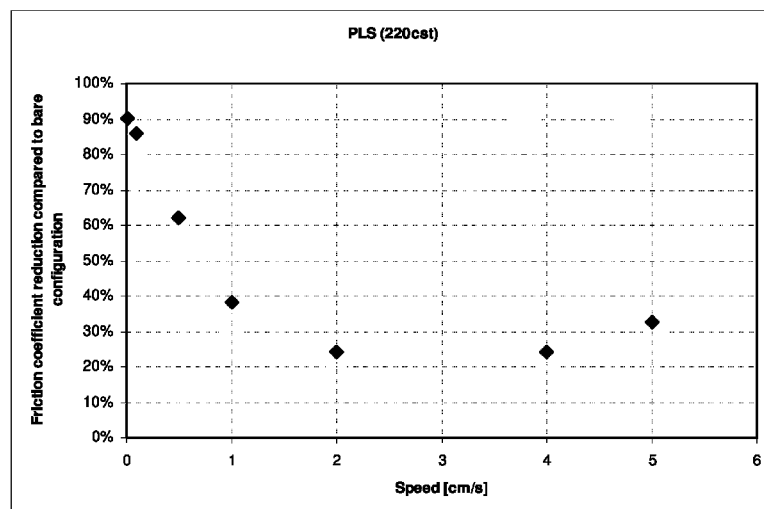
Figure 19:
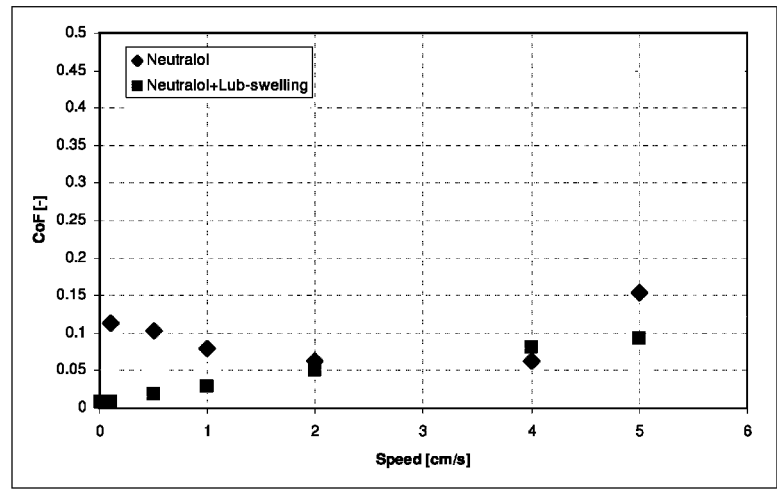
Figure 20:
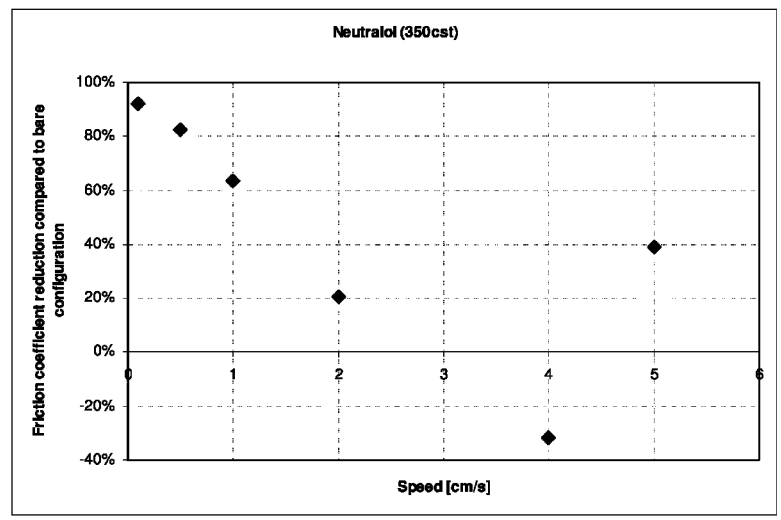
Figure 21:
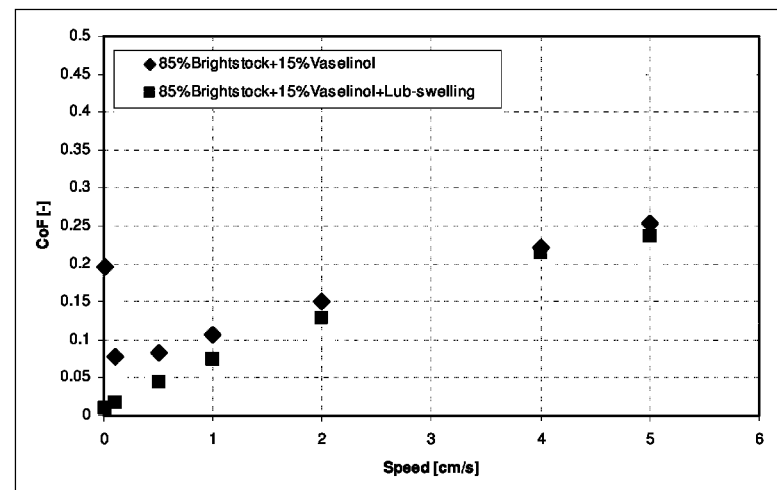
Figure 22:
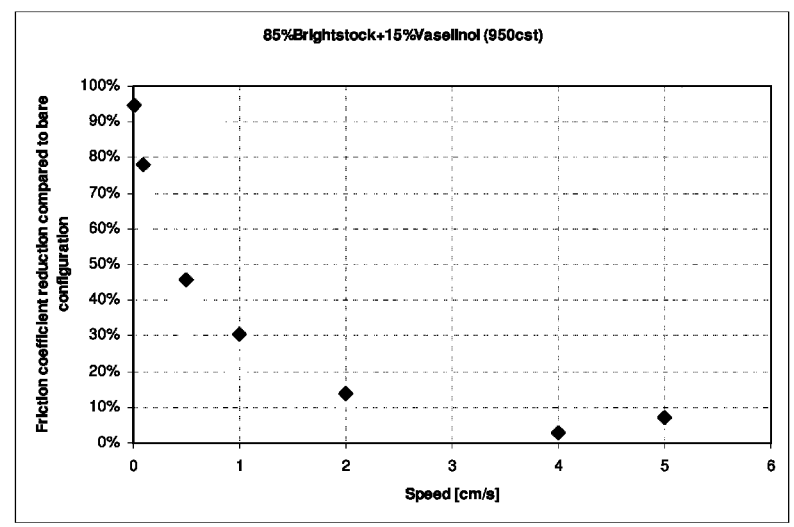
Figure 23:
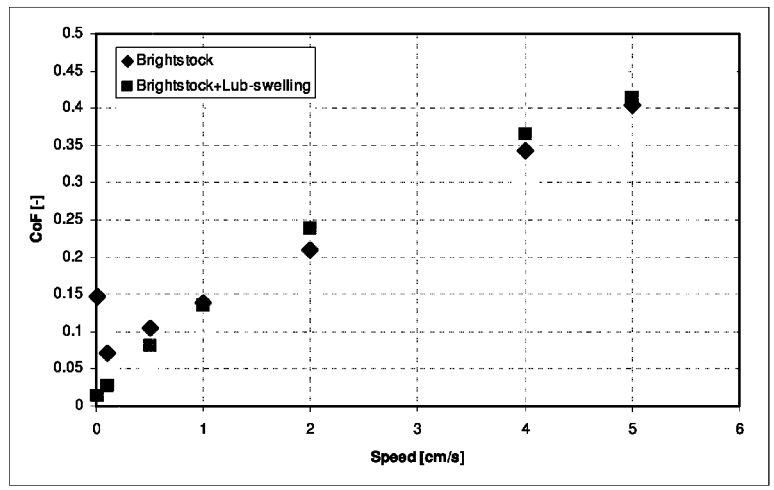
Figure 24:
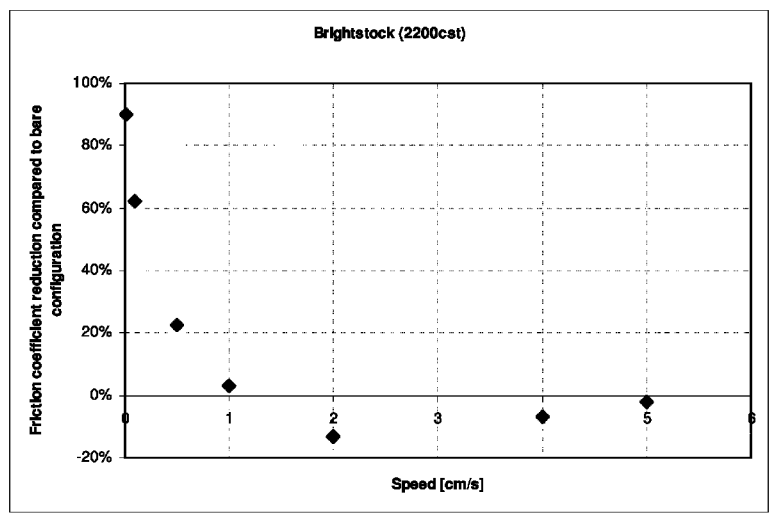
Figure 25:
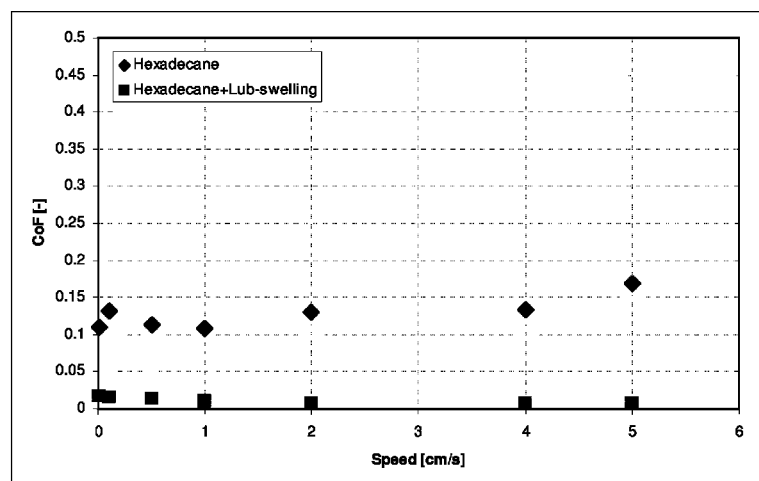
Figure 26:
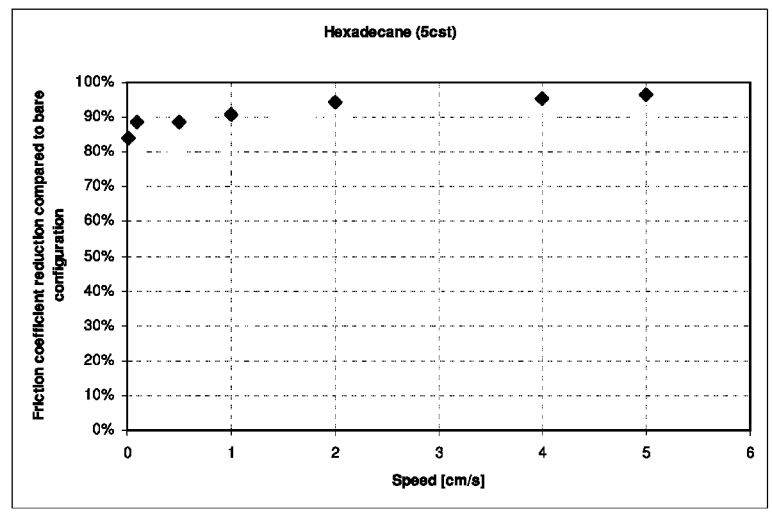
Figure 27:
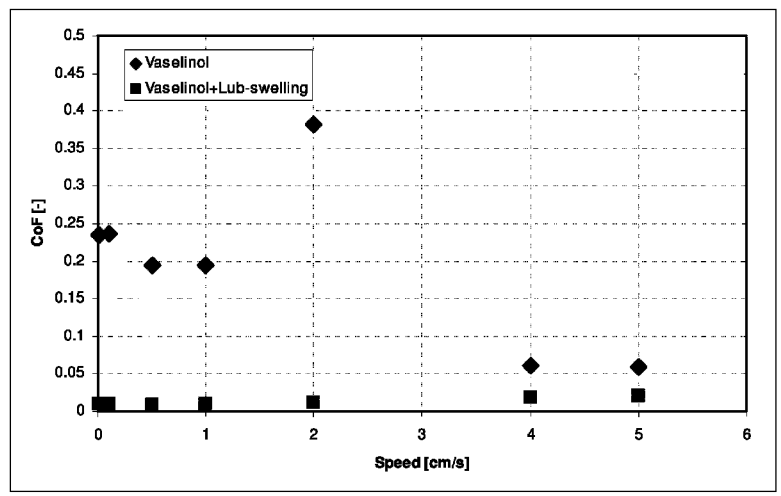
Figure 28:
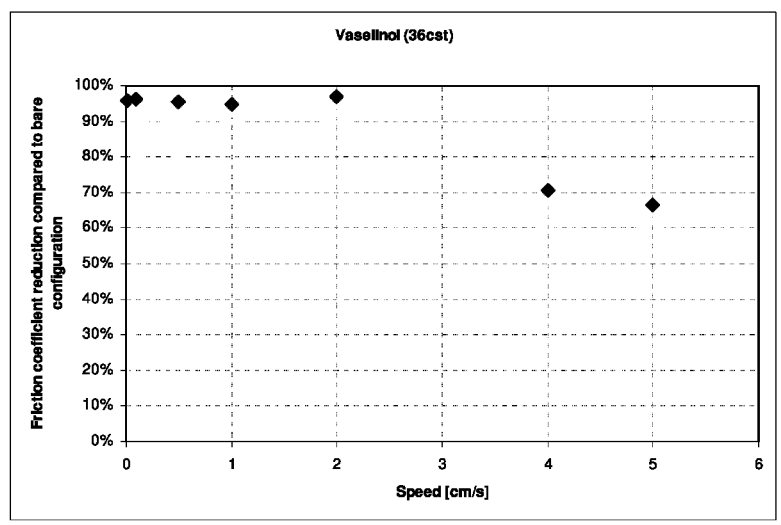

FIGS. 11-16 are graphs showing the positive influence of the lub-swelling configuration compared to the bare surface one regarding different ester type lubricants. In FIGS. 11-12, HP500, an ester lubricant, having a viscosity of 500 cst while viscosity of water is 1 cst. The contact surfaces are glass & silicon, and polymer is of the P12MA type on both surfaces (with a 250 nm thickness in dry state).

FIG. 11 shows the positive influence of the lub-swelling configuration compared to the bare surface one. At low speeds (<1 cm/s), due to the ejection of trapped lubricant within the grafted polymers, the boundary lubrication regime is cancelled out. This phenomena (the expulsion of lubricant when the polymers are subjected to pressure), prevents the interlocking between the surface asperities. At higher speed (>1 cm/s), the role of the lub-swelling polymers is minimized by the role of the lubricant in the surface separation. The shearing is taken away from the polymers' area to take place within the lubricant only.

Another way to put forward the positive influence of the lub-swelling polymers is to plot (see FIG. 12) the reduction of coefficient of friction compared to the bare surface configuration, with speed. As expected, the improvement is "low" at sufficient speeds because the polymers are far from the tribological action that takes place within the lubricant (shearing). The increase of performances appears at low speeds (<1 cm/s) and the friction reduction can reach 95%.

For this ester-family lubricant, with a viscosity of 500 cst (water: 1 cst), the lub-swelling polymers have a positive tribological role on the friction at low speeds (<1 cm/s), cancelling out the negative boundary lubrication. In terms of wear, it is expected to see none at all due to the full separation of the surfaces by the ejection of lubricant when the polymers are subject to pressure.

The gain is similar with the other ester-family lubricants tested (HP1000 & HP1300 with respective viscosities of 1000 cst and 1300 cst, see FIGS. 13-16). It shows a good compatibility of the P12MA-250 nm with the ester-family lubricants and within a large range of viscosity. This configuration can already be tested in movement as the HP family of lubricants is watchmaking lubricants used in several applications (pivots, etc.). Their properties and stability are well proved and suitable within a watchmaking environment.

FIGS. 17-28 are graphs showing the positive influence of the lub-swelling configuration compared to the bare surface one regarding different alkane type lubricants. The contact surfaces are glass & silicon, and polymer is of the P12MA type on both surfaces (with a 250 nm thickness in dry state).

FIGS. 17-24 are graphs with a viscosity range from 200 cst to 2200 cst. For these "high viscosity" alkanes, the behaviour of the lub-swelling configuration is similar to the ester one. The grafted polymers prevent the apparition of the boundary lubrication regime that usually shows an increase in the coefficient of friction (see the bare configurations). At this stage, it appears that the P12MA-250 nm is relevant to improve the tribological performances of a given system, with both ester and alkane families lubricants and over a large range of viscosities.

Another advantage of the polymer use is that it allows the application of usually repulsive lubricants on bare surfaces. In the case of Silicon, some ester cannot be used because they form a drop easy to be put away. Because of the good compatibility with the polymers, the lubricant can stay with the contact.

FIGS. 25-28 are graphs with a low viscosity alkane: Hexadecane (5 cst) and Vaselinol (36 cst). In the case of low viscosity lubricants, the results of the use of lub-swelling polymers look even stronger over a broader range of speeds. Low lubricants have poor ability to efficiently separate the surfaces. This results in random coefficients of friction (usually high but not always). The lub-swelling configuration can stabilize at low values the coefficients of friction, on a large range of speeds. The surfaces are well separated and the poor viscosity allows low shearing forces, i.e. low friction. Once again, the use of the polymers brings to better tribological performances, even for low viscosity lubricants where the friction can be kept low over a large range of speeds.

Figure 29:
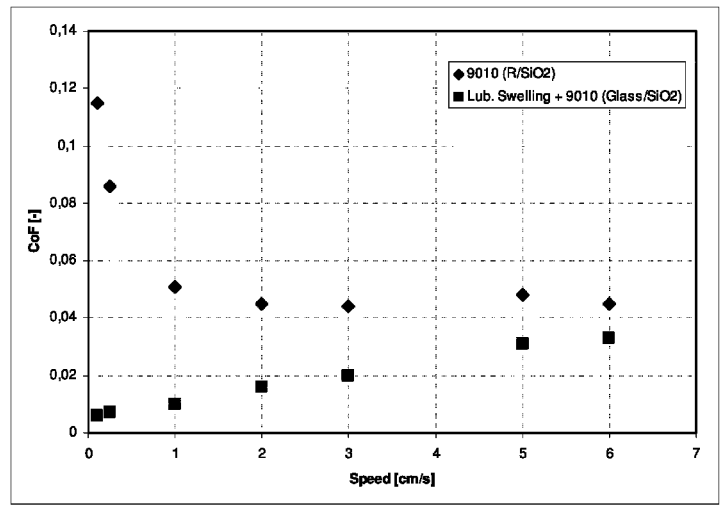
Figure 30:
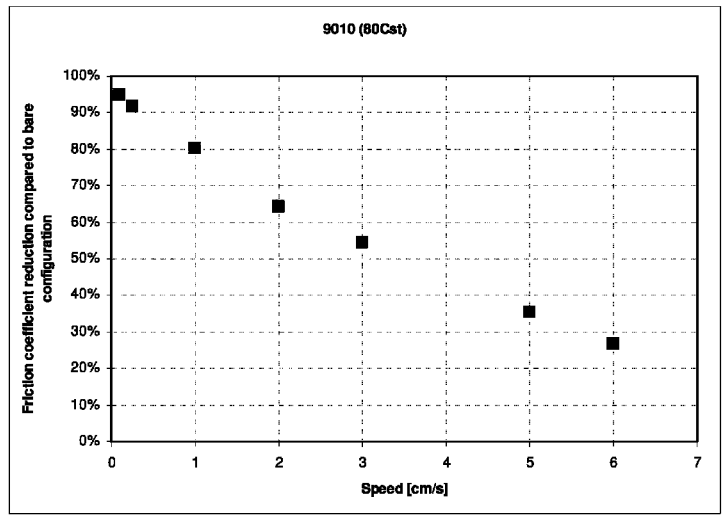
Figure 32:
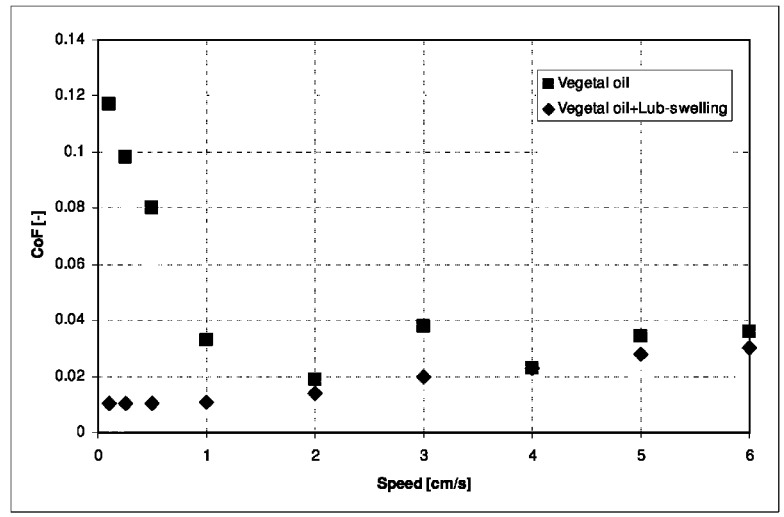
FIGS. 32-35 are graphs showing the positive influence of the lub-swelling configuration compared to the bare surface one regarding different vegetal or animal oils.
Figure 33:
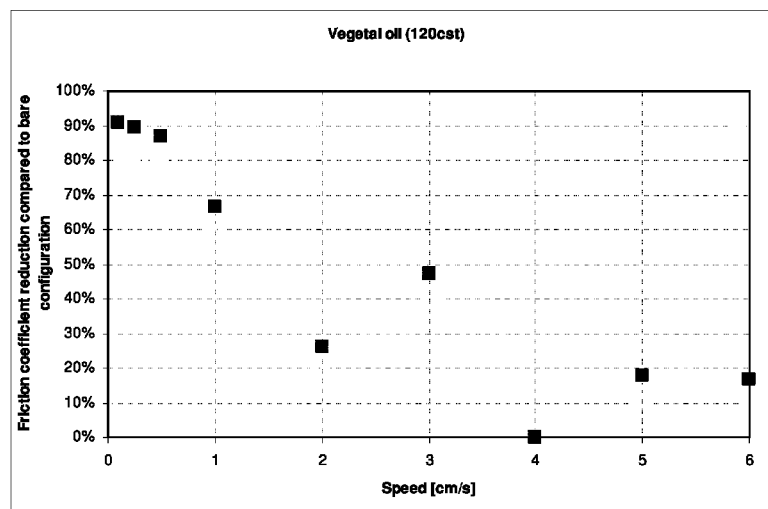
Figure 34:
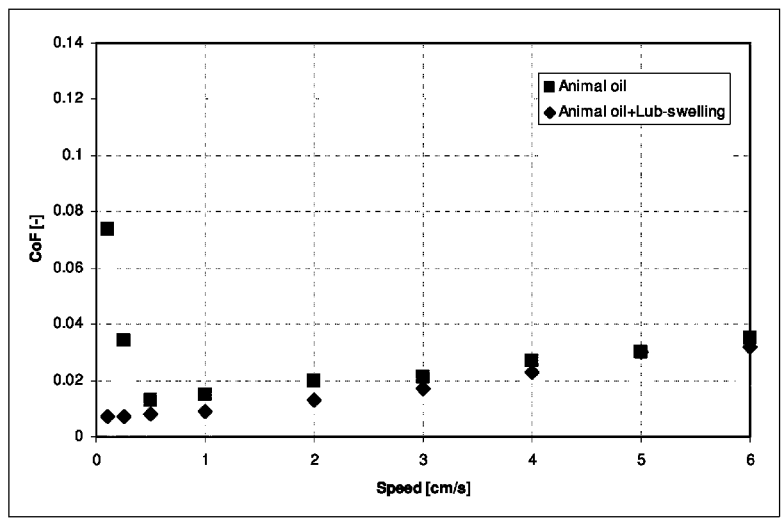
Figure 35:
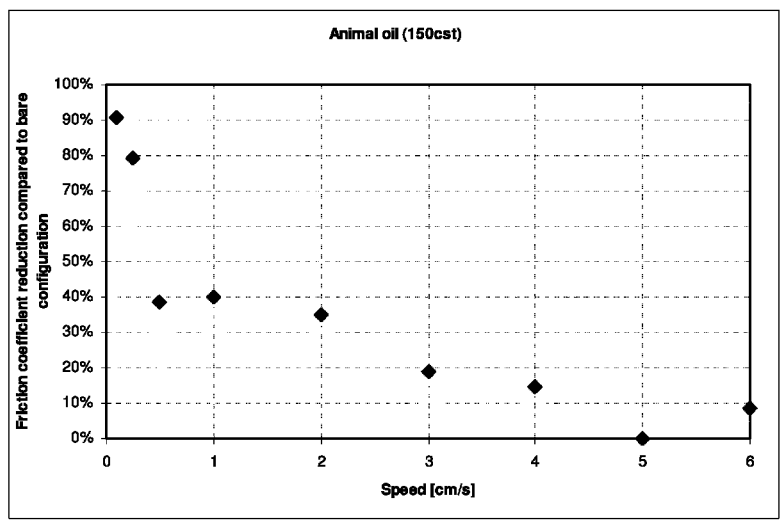

FIGS. 29-30 are graphs showing the positive influence of the lub-swelling configuration compared to the bare surface one regarding alkyl-aromatic and ether-alcohol type lubricants. The contact surfaces are glass & silicon, and polymer is of the P12MA type on both surfaces (with a 250 nm thickness in dry state).

FIGS. 29-30 are graphs related to the horological Moebius 9010 lubricant tests. It can be seen that lub-swelling effect is present as it occurs a very low coefficient of friction comprised between 0.007 and 0.03. Hence, regarding alkyl-aromatic and ether-alcohol type lubricants, the behaviour of the lub-swelling configuration is similar to the ester or alkane one.

FIGS. 32-35 are graphs related to vegetal and animal oils that are or have been used in the watchmaking industry. Despite a slightly more polar behaviour, the lub-swelling effect is effective and provides great tribological improvement, especially at low speeds, compared to bare surfaces.

The first goal of the lubricant-swelling polymers is to achieve supralubrication (coefficients of friction below 0.05, no noticeable wear) by the liberation of the proper quantity of lubricant (trapped within its matrix) within the contact. Their second objective (as part of the first one) is to suppress the boundary lubrication regimes classically obtained with either low viscosity of the lubricant, high pressures or low speeds (or a combination of these factors).

In this respect, both objectives have been reached. Lubricants from the alkane and ester families have been tested successfully and classical horological lubricants are expected to give the same results. These results do make the prevent invention a suitable candidate for a watchmaking application (such as at the balance pivot or the escapement) in order to increase the efficiency and reliability of the movements.

The use of low viscosity lubricants such as hexadecane or vaselinol has given the best friction coefficients (<0.01) on a large range of speeds (from 0.01 to 6 cm/s). The combination of the proper polymer (P12MA), with a sufficient thickness to prevent its destruction (here tested at 250 nm) and a compatible lubricant with low viscosity, is the best compromise to obtain the supralubrication effect whatever the solicitations within the contact are (pressure, speed).

Figure 10C:
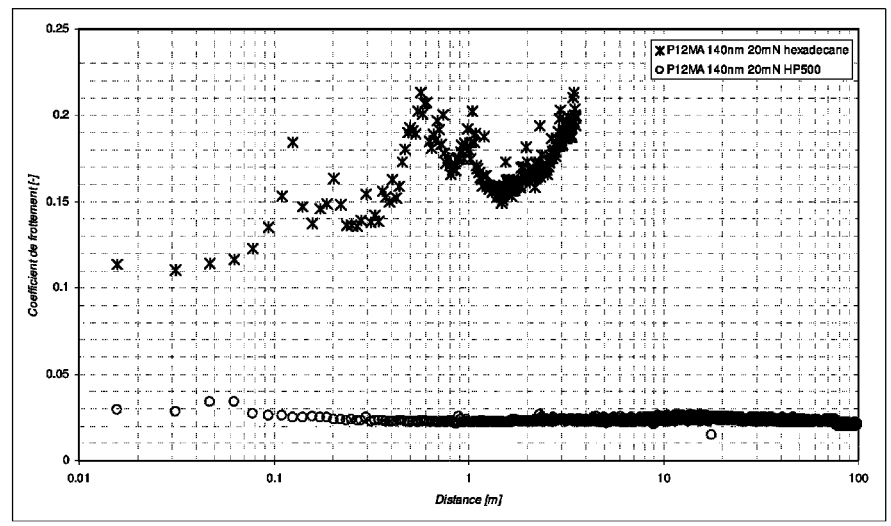
Figure 10D:
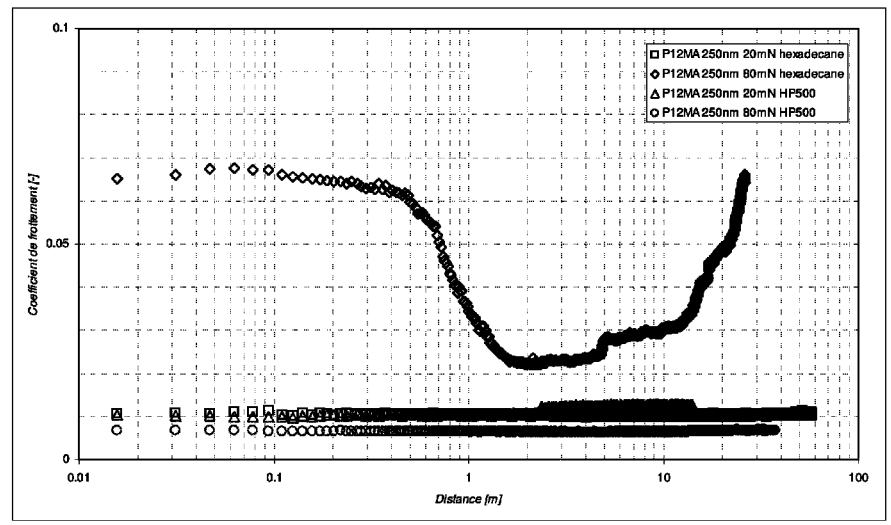

Endurance tests have proven the strong wear resistance of such polymer coatings (stable low friction over 5 kilometers of friction, with the use of a viscous lubricant so far). FIGS. 10b, 10c, 10d show a sample of tests performed over 100 m (or less in some cases) for the P12MA polymer at different thicknesses, in various lubricants and for 2 loads (20 mN and 80 mN). The results highlight the importance of the polymer thickness as well as the nature of the lubricant to avoid a degradation of the tribological performances. The combination of a sufficient thickness and a satisfying lubricant viscosity allows long term resistance to wear, with a compromise made on the friction coefficient value.

The choices of the polymer, its thickness and the lubricant still have to be optimized in order to find the optimal solution. There is however no reason to think that longer alkyl chains (like P18MA), or more polar chains (such as polyalcohol and glycol like polymers), and thicker coatings do not give equivalent or better results as long as the good swelling solvent is associated to the polymer. Broadly, we could consider important variations of chemical nature and polarity of the type: alkane<ether~ester<ether-alcohol<Silicon oils<Vegetable oils<Animal oils<Polyalcohol or glycol<<ionic liquids.

The invention claimed is:

1. A watch comprising:
a first substrate surface; and
a second substrate surface;
wherein at least one of the surface of the first and second substrates is covered with a low friction device that reduces a friction coefficient and wear of the first substrate surface against the second substrate surface,
the low friction device comprises a solvent and a coating comprising polymer brushes bonded to the surface and swollen by solvation of the solvent,
wherein the solvent is selected from the group consisting of an ester lubricant, an alkane lubricant, an alkyl-aromatic lubricant, an ether-alcohol lubricant, a vegetal oil, an animal oil, a polyalcohol and an ionic liquid, and
wherein the solvent is trapped within the polymer brushes and is ejected from the polymer brushes when the polymers brushes are subjected to pressure in such a way that the friction coefficient and the wear of the first substrate surface against the second substrate surface are reduced due to the ejection of the solvent.

2. The watch of claim 1, wherein the polymer brushes comprise a hydrophobic alkyl-methacrylate.

3. The watch of claim 2, wherein the polymer brushes comprise dodecyl-methacrylate (P12MA).

4. The watch of claim 1, wherein the polymer brushes have a dry thickness of at least 250 nm.

5. The watch of claim 1, wherein the polymer brushes are grafted onto at least one of the substrates by pre-anchored initiator molecules.

6. The watch of claim 1, wherein the solvent has a viscosity less than 200 cst.

7. The watch of claim 1, wherein the first substrate, the second substrate, or both substrates comprise a metallic material, a non-metallic material, or both a metallic material and a non-metallic material.

8. The watch of claim 7, wherein the first substrate, the second substrate, or both substrates comprise a silicon-based material.

9. The watch of claim 1, wherein both substrates are covered with the coating comprising polymer brushes solvated by the solvent.

10. The watch of claim 1, wherein at least one of the substrates is a toothed wheel.

11. The watch of claim 1, wherein at least one of the substrates is a pivot.

12. The watch of claim 1, wherein at least one of the substrates is bearing block.

13. The watch of claim 1, wherein at least one of the substrates is an escapement element.

14. The watch of claim 5, wherein the initiator molecules comprise a monofunctional silane.

15. The watch of claim 1, wherein a graft density for the polymer brushes is from 0.1 to 0.7 chains/nm$^2$.

16. The watch of claim 2, wherein the hydrophobic alkyl-methacrylate comprises an alkyl group having from 12 to 18 carbons.

17. A method to reduce friction and wear between two surfaces of a watch, comprising:
coating at least one of the two surfaces with a layer of polymer brushes having a dry thickness of at least 250 nm; and
applying a solvent to solvate and swell the polymer brush layer;
wherein the polymer brushes comprise a hydrophobic alkyl-methacrylate, and
the solvent is selected from the group consisting of an ester type lubricant, an alkane type lubricant, an alkyl-aromatic lubricant, an ether-alcohol lubricant, a vegetal oil, an animal oil, a polyalcohol and an ionic liquid, and
wherein the solvent is trapped within the polymer brushes and is ejected from the polymer brushes when the polymers brushes ore subjected to pressure in such a way that the friction coefficient and the wear of the first substrate surface against the second substrate surface are reduced due to the ejection of the solvent.

18. The method of claim 17 wherein both surfaces are coated with the polymer brushes.

19. The method of claim 17, wherein the coating of at least one surface with polymer brushes comprises bonding initiator molecules to the surface and grafting the polymer brushes onto the initiator molecule.

* * * * *